United States Patent
Hilliard et al.

(10) Patent No.: US 11,092,519 B1
(45) Date of Patent: Aug. 17, 2021

(54) SYSTEM AND METHOD FOR AUTOMATED SAMPLING AND ANALYSIS

(71) Applicant: Elemental Scientific Lasers, LLC, Omaha, NE (US)

(72) Inventors: Shane Hilliard, Bozeman, MT (US); Jay N. Wilkins, Belgrade, MT (US); Erik B. Larsen, Bozeman, MT (US); Robert W. Hutchinson, Sheffield (GB); Ciaran J. O'Connor, Bozeman, MT (US)

(73) Assignee: Elemental Scientific Lasers, LLC, Omaha, NE (US)

( * ) Notice: Subject to any disclaimer, the term of this patent is extended or adjusted under 35 U.S.C. 154(b) by 440 days.

(21) Appl. No.: 15/889,979

(22) Filed: Feb. 6, 2018

Related U.S. Application Data

(60) Provisional application No. 62/455,066, filed on Feb. 6, 2017.

(51) Int. Cl.
*G01N 1/04* (2006.01)
*G01N 35/10* (2006.01)

(52) U.S. Cl.
CPC .............. *G01N 1/04* (2013.01); *G01N 35/10* (2013.01); *G01N 2001/045* (2013.01)

(58) Field of Classification Search
CPC ..... G01N 1/04; G01N 35/10; G01N 2001/045
USPC ....................................................... 73/863.01
See application file for complete search history.

(56) References Cited

U.S. PATENT DOCUMENTS

| | | | | | |
|---|---|---|---|---|---|
| 3,614,243 | A | * | 10/1971 | Harvey | G01N 21/0303 356/246 |
| 3,941,567 | A | * | 3/1976 | Combaz | G01N 30/12 422/80 |
| 5,170,286 | A | * | 12/1992 | Zimmerberg | G02B 21/34 356/246 |
| 5,414,556 | A | * | 5/1995 | Focht | B01L 9/527 356/246 |
| 6,437,328 | B1 | * | 8/2002 | Knauss | B82Y 35/00 250/307 |
| 7,888,074 | B2 | * | 2/2011 | Ehricht | B01F 13/0076 422/68.1 |
| 8,274,735 | B2 | * | 9/2012 | Fry | G01N 21/71 356/244 |
| 9,700,960 | B2 | * | 7/2017 | Jeong | B23K 26/362 |

(Continued)

*Primary Examiner* — Nathaniel T Woodward
(74) *Attorney, Agent, or Firm* — Kevin E. West.; Advent, LLP

(57) ABSTRACT

A system for facilitating automated handling using laser ablation system is described that includes a sample generation system. In an embodiment, the sample generation system can include a sample chamber with a sample chamber body, a transmission window and a sealing member coupled to the sample chamber body, an inlet conduit extending through the sample chamber body and intersecting a sidewall of the interior space, and an outlet conduit extending through the sample chamber body and intersecting at least one of the sidewall of the interior or a lower surface of the sample chamber body; a placement system including a frame, and an actuator assembly coupled to the frame, where the actuator assembly is configured to place the sample adjacent to the sample chamber for laser ablation; and a laser configured to produce a laser beam that is propagated along a beam path to irradiate the sample.

20 Claims, 12 Drawing Sheets

(56) References Cited

U.S. PATENT DOCUMENTS

| | | | | |
|---|---|---|---|---|
| 2013/0162991 A1* | 6/2013 | O'Connor | ............... | G01J 3/443 356/317 |
| 2014/0268134 A1* | 9/2014 | O'Connor | ................ | H05H 1/30 356/318 |

* cited by examiner

SYSTEM AND METHOD FOR AUTOMATED SAMPLING AND ANALYSIS

BACKGROUND

Laser ablation techniques can use a laser beam to ablate a portion of a sample. A resulting ablation plume can then be passed to an analysis system.

BRIEF DESCRIPTION OF THE DRAWINGS

FIG. 5 illustrates a top plan view of a carrier plate, FIG. 5A illustrates a cross-section view of a portion of the carrier plate shown in FIG. 5, taken along line VA-VA, and 5B illustrates a plan view of the carrier plate shown in FIG. 5, taken along line VB-VB.

DETAILED DESCRIPTION

Figure 1:
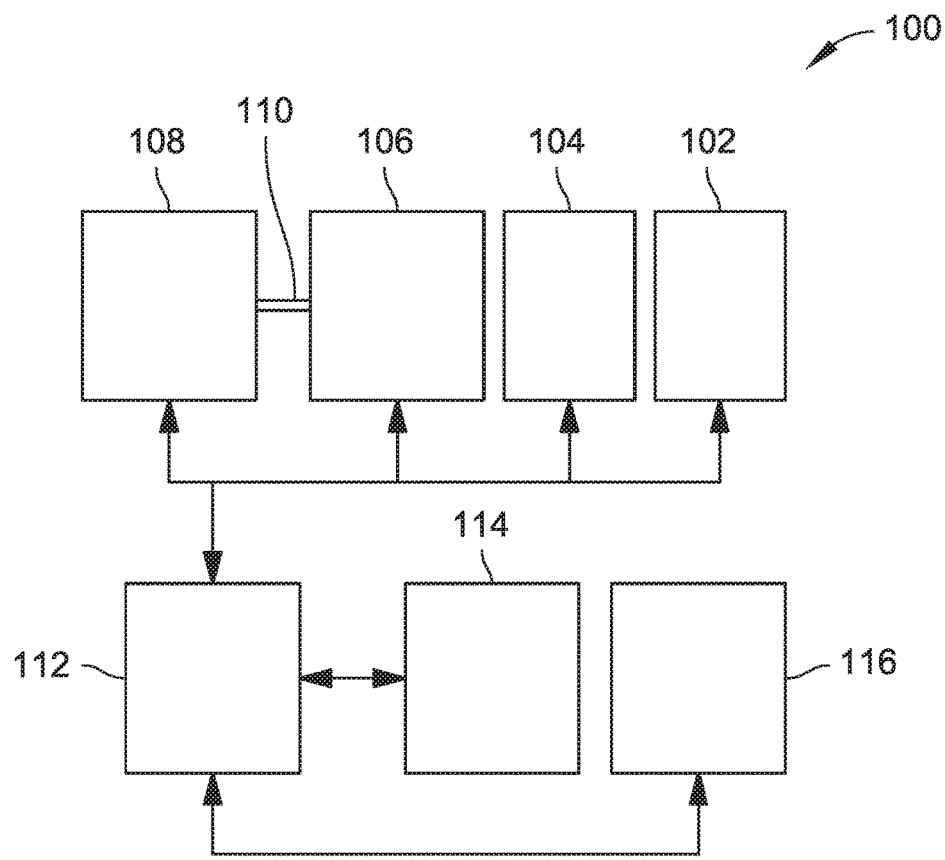
FIG. 1 is a schematic view illustrating a system for facilitating automated handling, sampling and analysis of objects, according to one embodiment.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

System Overview

Referring to FIG. 1, a system for facilitating automated handling, sampling and analysis of objects, such as system 100, can include an object handling system 102, an inspection system 104 and a sample generation system 106. Optionally, the system 100 may include a sample analysis system 108, a transport conduit 110, a controller 112, a memory device 114, a user interface 116 or any combination thereof.

Generally, the object handling system 102 is configured to handle an object to be sampled by the sample generation system 106 and, ultimately, analyzed by the sample analysis system 108. Examples of objects that may be sampled and analyzed include solid materials such as rocks, minerals, glasses, ceramics, metals, metal alloys, polymers, soil, paper, pharmaceutical agents (e.g., pills), biological materials (e.g., bone, teeth, or other biological tissues such as those taken from the liver, brain, etc.), biological assay substrates, or the like or any combination thereof.

Materials such as rocks, minerals, glasses, ceramics, metals, metal alloys, polymers, etc., can be provided in a solid bulk form or, alternatively, as a loose powder, a pressed powder, as a fused bead, or the like. Pressed powders may be prepared by obtaining a loose powder of the material and pressing the powder in a die to produce a pellet. Optionally, the powder may be mixed with binder (e.g., a cellulose wax, etc.) prior to pressing. For purposes of discussion herein, soil can be considered to be a "powder," or may be ground into a powder. Fused beads may be created by dissolving a powder of the material in a flux such as lithium tetraborate or a tetraborate/metaborate mixture, etc., and casting the mixture into a mold.

Figure 2:
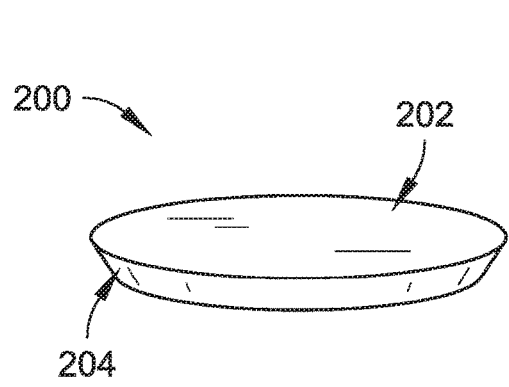
FIGS. 2 and 3 are schematic views illustrating exemplary objects that can be sampled and analyzed by the system shown in FIG. 1.

Referring to FIG. 2, an object, such as object 200, provided as a pressed pellet or fused bead discussed above, may be characterized as being disk-shaped with a generally flat surface 202. In one embodiment, the object handling system 102 may be configured to handle the object 200 such that a sample of the object 200 can be obtained, by the sample generation system 106, from the surface 202. Alternatively, the object handling system 102 may be configured to handle the object 200 such that a sample of the object 200 can be obtained, by the sample generation system 106, from any other surface thereof (e.g., from surface 204). Although FIG. 2 illustrates the object 200 as a disk having a generally frusto-conical shape, it will be appreciated that the disk may have a cylindrical shape, or any other suitable or desired shape.

Other examples of objects that may be sampled and analyzed include liquid materials such as blood, saliva, ink, paste, or the like or any combination thereof. Liquid materials can be applied to a supporting substrate such as filter paper (e.g., formed of cotton cellulose, glass fibers, etc.), an IR card, an absorbant material, or any other substrate which into which the liquid sample can soak into or otherwise adhere.

Figure 3:
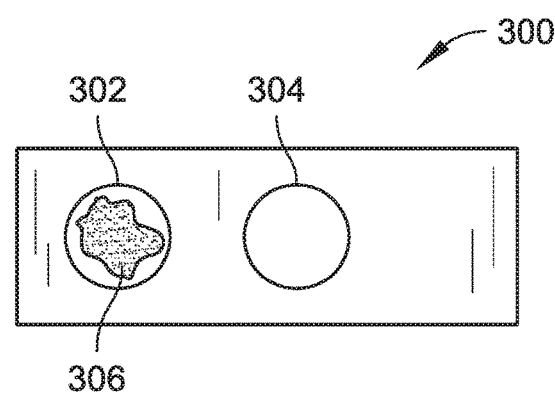

Referring to FIG. 3, an object, such as object 300, provided as a card formed of absorbant material (e.g., filter paper, etc.). The card 300 may be printed upon or otherwise marked with indicia indicating at least two regions (e.g., first region 302 and second region 304), and liquid material can be applied to the first region 302. As shown in FIG. 3, liquid material (e.g., blood, saliva, etc.) has been applied to the first region 302 of the card 300 (e.g., as one or more droplets, etc.) and absorbed into, or otherwise dried on, the card 300, as indicated at 306. In one embodiment, the object handling system 102 may be configured to handle the card 300 such that a sample of the absorbed/dried liquid 306 can be obtained from first region 302 and, optionally, such that a sample of the card 300 can be obtained from second region 304.

Referring back to claim 1, the inspection system 104 may, in one embodiment, be configured to obtain information that can be used to identify the object (i.e., "identification information"). For example, the object may include a label affixed thereto that includes a barcode, a QR code, a Data Matrix code, or any other indicia (e.g., letters, numbers, etc.), or any combination thereof, representing identification information (e.g., that identifies the object, etc.), Accordingly, inspection system 104 may include an optical device such as a scanner (e.g., a laser scanner, a CCD reader, an omnidirectional barcode scanner, or the like or any combination thereof) to decode or otherwise read the code, indicia, etc., and output (e.g., to the controller 112), a signal corresponding to the identification information represented by the code, indicia, etc. Alternatively, the scanner may be provided as a two-dimensional imaging camera (e.g., a digital camera) configured to capture imagery (e.g., one or more still images, video, or a combination thereof) and output (e.g., to the controller 112) image data corresponding to the captured imagery. Once received, the controller 112 may process the image data to derive a signal corresponding to the identification information represented by the code, indicia, etc.

In another embodiment, the inspection system 104 may be configured to capture imagery of the object. For example, the imagery captured may be of a location on the object where a sample can be taken (e.g., by the sample generation system 106). In this embodiment, the inspection system 104 may include an optical device such as a two-dimensional imaging camera (e.g., a digital camera) to capture imagery of the object and output (e.g., to the controller 112), image data corresponding to the captured imagery. Once received, the controller 112 may process the image data to determine whether a sample has already been obtained from the object. A determination as to whether a sample has already been obtained from the object can be made by determining whether the image data represents a characteristic change in contrast, color, brightness, etc., between two adjoining regions in the captured imagery. If the controller 112 determines that a sample has already been obtained from the object, then the controller 112 may control an operation of the object handling system 102 to, for example, return the object back to the object repository. If the controller 112 determines that a sample has not been obtained from the object, then the controller 112 may control an operation of the object handling system 102 and sample generation system 106 to sample the object. In one embodiment, the controller 112 may output data corresponding to the received image data to be communicated to a user (e.g., via a computer monitor of the user interface 116).

In yet another embodiment, the inspection system 104 may be configured to obtain identification information associated with the object and capture imagery of the object. In this embodiment, the inspection system 104 may include an optical device such as the aforementioned scanner in addition to a two-dimensional imaging camera (e.g., a digital camera, as described above). Alternatively, the inspection system 104 may simply only include a two-dimensional imaging camera. As used herein, data contained in any signal output by the inspection system 104, or any data derived by processing image data (e.g., at the controller 112) can also be referred to herein as "inspection data." Inspection data can be associated (e.g., at the controller 112) with analysis data (e.g., generated by the sample analysis system 108).

The sample generation system 106 is configured to remove a portion of the object which, for purposes of discussion herein, can be considered as a "sample" of the object. Thus, the act of removing one or more portions of the object can be considered as "sampling" the object. Generally, the sample generation system 106 is configured to direct laser light, along a beam axis, to irradiate a region of the object (e.g., at a laser spot, also referred to herein as simply as a "spot"). The laser light may be directed as one or more laser pulses generated by one or more lasers. One or more characteristics of the laser pulses may be selected, set or otherwise controlled to impinge a region of the object to ablate a portion of the object (e.g., a portion of the object irradiated at the laser spot). Ablated material is ejected from the object, forming a plume of ablated material, and can be transported—as a sample—to the sample analysis system 108 (e.g., via the transport conduit 110, which is coupled between the sample generation system 106 and the sample analysis system 108). Generally, the sample is transported to the sample analysis system 108 as an aerosol (i.e., a suspension of solid and possibly liquid particles and/or vapor in a carrier gas, such as helium gas, argon gas, etc.).

Generally, the sample generation system 106 includes one or more laser optics (e.g., one or more lenses, harmonic generation crystals, beam expanders, collimators, apertures, mirrors, acousto-optic modulators, etc.) configured to modify one or more characteristics such as wavelength, pulse duration, spot size, spot shape, pulse energy, average power, peak power, spatial intensity profile, temporal intensity profile, etc.

Characteristics of the laser pulses that may be selected, set or otherwise controlled to facilitate ablation of the object may, for example, include wavelength (e.g., in a range from about 157 nm to about 11 µm, such as 193 nm, 213 nm, 266 nm, or the like), pulse duration (e.g., in a range from about 100 femtoseconds to about 25 nanoseconds), size of the irradiated spot (also referred to as "spot size"), size of the irradiated spot (also referred to as "spot shape"), pulse energy, average power, peak power, spatial intensity profile, temporal intensity profile, etc. As used herein, the term "spot size" refers to the diameter or maximum spatial width of a laser pulse at a location where the beam axis is incident upon the object to be sampled. For purposes of discussion herein, spot size is measured as a radial or transverse distance from an axis of the beam path (i.e., the "beam axis") to where the optical intensity drops to, at least, $1/e^2$ of the optical intensity at the beam axis. Generally, the spot size of a laser pulse will be at a minimum at the beam waist. Depending upon the configuration and presence of the laser optics described above, the spot size may be in a range from 1 µm (or about 1 µm) to 9 mm (or about 9 mm). In some embodiment, the spot size may be greater than or equal to 250 µm, 300 µm, 500 µm, 600 µm, 700 µm, 750 µm, 900 µm, 950 µm, 1 mm, 1.2 mm, 1.5 mm, 1.7 mm, 2 mm, etc., or between any of these values. Artisans will recognize from the disclosure herein that, in some embodiments, a continuous wave (CW) or quasi-continuous wave (QCW) laser beam may be used instead of a pulsed laser beam.

Optionally, the sample generation system 106 may include beam steering optics (e.g., fast steering mirrors, mirror galvanometer deflectors, electro-optic deflectors, and/or acousto-optic deflectors, or the like or any combination thereof) configured to move the beam axis (and, thus, the laser spot) relative to the object. Movement of the beam axis relative to the object may occur along one or more axes (e.g., along an X-axis, which is generally orthogonal to the beam axis, along a Y-axis, which is generally orthogonal to the beam axis and the X-axis, or the like or any combination thereof).

The sample analysis system 108 is configured to analyze the composition (e.g., elemental composition, isotopic composition, etc.) of the sample obtained at the sample generation system 106. Prior to analysis, the sample is typically ionized by a sample preparation system (not shown), e.g., an inductively coupled plasma (ICP) torch, etc. The sample preparation system may be incorporated into the sample analysis system 108 or coupled to an input of the sample analysis system 108. The sample analysis system 108 may be provided as a mass spectrometry (MS) system, optical emission spectrometry (OES) system, or the like or any combination thereof. Examples of MS systems that may be used include a quadrupole mass spectrometry systems, time-of-flight (TOF) mass spectrometry systems, cytometry by TOF (CyTOF) spectrometry systems, or the like or any combination thereof. The sample analysis system 108 may further be configured to generate one or more signals or data representing results of the compositional analysis of the obtained sample (herein referred to as "analysis data") and output the analysis data to the controller 112.

The controller 112 is configured to control operations of one or more of the aforementioned components such as the object handling system 102, inspection system 104, sample generation system 106 and the sample analysis system 108, the user interface 116, or the like or any combination thereof. The controller 112 may also be used, in certain embodiments, to control supplemental devices such as the sample preparation system, the analysis system, or the like or any combination thereof. An artisan will understand from the disclosure herein that more than one controller 112 may also be used.

Generally, the controller 112 includes one or more processors configured to control operations of one or more of the aforementioned components of the system 100, or any combination thereof, upon executing instructions. A processor can be provided as a programmable processor (e.g., including one or more general purpose computer processors, microprocessors, digital signal processors, or the like or any combination thereof) configured to execute the instructions. Instructions executable by the processor(s) may be implemented as software, firmware, etc., or in any suitable form of circuitry including programmable logic devices (PLDs), field-programmable gate arrays (FPOAs), field-programmable object arrays (FPOAs), application-specific integrated circuits (ASICs)—including digital, analog and mixed analog/digital circuitry or the like, or any combination thereof. Generally, instructions implemented software (e.g., executable code, files, instructions, etc., library files, etc.) may be written in computer programming languages such as C, C++, Visual Basic, Java, Python, Tcl, Perl, Scheme, Ruby, etc. Execution of instructions can be performed on one processor, distributed among processors, made parallel across processors within a device or across a network of devices, or the like or any combination thereof.

The memory device 114 includes tangible media such as computer memory on which computer-executable instructions can be stored, to be read (e.g., via one or more wired or wireless communications links) and executed by the controller 112 to cause the object handling system 102, the sample generation system 106 and, optionally, the sample analysis system 108, to function as described herein. The memory device 114 may also store image data representative of imagery captured by the inspection system 104, and other data associated with the processes described herein (e.g., image data, sample data, etc.). Although illustrated as a separate component from the controller 112, the memory device 114 may be provided as an integral component of the controller 112. Moreover, although FIG. 1 illustrates only a single memory device 114, it will be appreciated that multiple memory devices 114 may be provided. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or the like or any combination thereof.

The user interface 116 may include one or more input devices (e.g., a computer keyboard, a computer mouse, a trackpad, a stylus, a button, a touchscreen, a microphone, etc.) one or more output devices (e.g., a computer monitor, a printer, a haptic actuator, a speaker, etc.) or the like or any combination thereof. The user interface 116 may also include a graphical user interface (GUI) displayable by a computer monitor a touchscreen, etc., which includes one or more windows, drop-down menus, buttons, scroll bars, icons, etc., that the user may interact with (e.g., via one or more input devices).

In one embodiment, the user interface 116 enables a user to select one or more objects (e.g., located in a predetermined area, such as an object repository as described in greater detail below) to sample. Selected objects can then be handled or otherwise manipulated (e.g., by the object handling system 102, the sample generation system 106, or the like or any combination thereof) in a serial or parallel manner to brought into and out of operable proximity with the inspection system 104 and the sample generation system 106 in any suitable or desired manner.

In another embodiment, the user interface 116 enables a user to select a particular region of the sample 106 to ablate or otherwise dissociate for analysis (e.g., at an analysis system) and enable a user to define or otherwise select a beam trajectory (e.g., a path extending along any combination of the X-, Y- and Z-axes) along which the laser beam is to be scanned on the object. The user may define one more single spots, a line of distinct spots, a grid of distinct spots, a line of continuous ablation (e.g., overlapping laser spots creating a continuous kerf), and/or a raster pattern covering a two-dimensional (2D) area of the object. In certain embodiments, multiple passes of the laser beam along the same spot, line, or raster pattern may be used to cut deeper into the sample so as to generate three-dimensional (3D) spectroscopy data. Accordingly, a beam trajectory can be characterized by one or more parameters such as start location, end location, number of spots, pitch between adjacent spots, overlap of adjacent spots, line shape, line length, or the like or any combination thereof. As used herein, a beam trajectory along which the laser beam is scanned can also be characterized as a "scan," and the act of ablating or otherwise dissociating a region of the sample 106 along a beam trajectory can also be characterized as "scanning" the laser beam or "executing" a scan.

Data corresponding to selections or instructions given by the user via the user interface 116 (collectively referred to herein as "user interface data") can be communicated to the controller 112 (e.g., as computer-executable instructions executable by the controller 112, etc.), stored at the memory device 114, or the like or any combination thereof.

Embodiments Concerning the Object Handling System

As mentioned above, the object handling system 102 is configured to handle an object to be sampled by the sample generation system 106 and, ultimately, analyzed by the sample analysis system 108. For example, the object handling system 102 may include one or more manipulators (e.g., a robotic manipulator, such as a Cartesian robot, an articulated robotic arm, a SCARA robot, or the like or any combination thereof), a carousel, a conveyor belt, and/or a thread. A robotic manipulator may be equipped with one or more end effectors to hold or otherwise retain the object. Examples of end effectors include mechanical grippers, vacuum- or Bernoulli-type effectors (e.g., including one or more suction cups, vacuum pads, edge grips, or the like or any combination thereof), electrostatic chucks, magnets, hooks, ladles, or the like or any combination thereof. In another example, the object handling system 102 may include one or more robotic manipulators, conveyor systems, carrier plate systems, or the like or any combination thereof. Examples of robotic manipulators include Cartesian robots, articulated robotic arms, SCARA robots, or the like or any combination thereof. Examples of conveyor systems include belt conveyors, bucket conveyors, a flexible conveyor system (e.g., based on a conveyor beam with low-friction slide rails guiding a multi-flexing chain), a vertical conveyor system (also known in the art as a freight lift or material lift), an electric track vehicle system, a lineshaft roller conveyor system, a skatewheel conveyor system, a chain conveyor system, a belt- or chain-driven live roller conveyor system, a carousel conveyor system, or the like or any combination thereof, as known in the art. Carrier plate systems may include a carrier plate coupled to an actuator and be configured, as is known in the art, to impart motion (e.g., continuously, in an indexed manner, or any combination thereof) to the carrier plate. The carrier plate is generally structured or otherwise configured to hold, retain, or otherwise support one or more objects, and examples of motion that a carrier plate system can impart to the carrier plate include linear motion (e.g., along one or more axes), rotary motion (e.g., about one or more axes), or any combination thereof.

Figure 4:
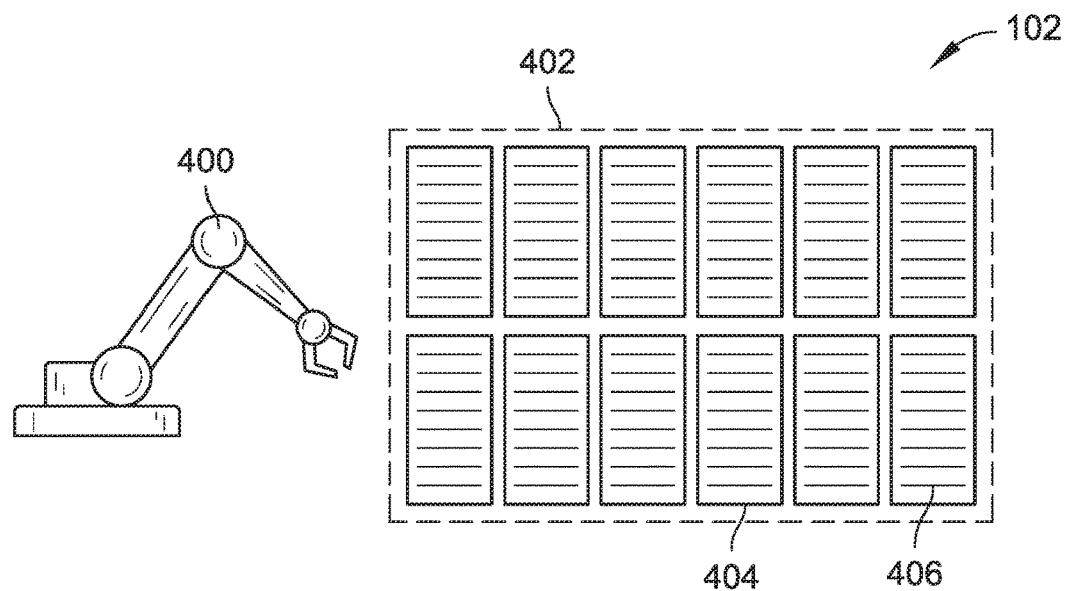
FIG. 4 is a schematic view illustrating one embodiment of the object handling system in the system shown in FIG. 1.

In one embodiment, the object handling system 102 includes a robotic manipulator (e.g., as shown in FIG. 4 at 400). Although FIG. 4 illustrates the robotic manipulator 400 as any an articulated robotic arm, it will be appreciated that the robotic manipulator 400 may be provided as any suitable robotic manipulator (e.g., a Cartesian robot, an articulated robotic arm, a SCARA robot, or the like or any combination thereof). In this embodiment, the object handling system 102 may further include an object repository, such as object repository 402, where objects (e.g., which are to be sampled, which have been sampled, or the like or any combination thereof) can be stored. As exemplarily shown in FIG. 4, the object repository 402 includes a collection of bins, trays, shelves, or the like or any combination thereof (each generically referred to as a storage unit 404), configured to store one or more objects 406 (e.g., which are to be sampled, which have been sampled, or the like or any combination thereof).

Figure 4A:
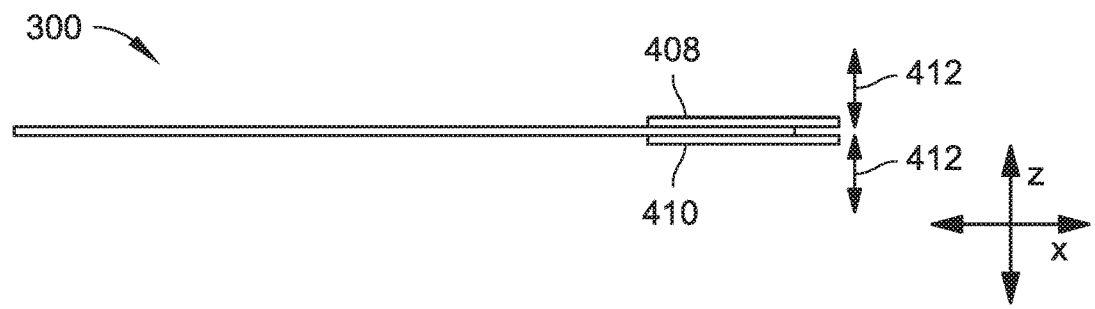
FIGS. 4A and 4B illustrate side and top plan views, respectively, illustrating an object such as the card shown in FIG. 3, held by an end effector of a robotic manipulator according to one embodiment of the present invention.
Figure 4B:
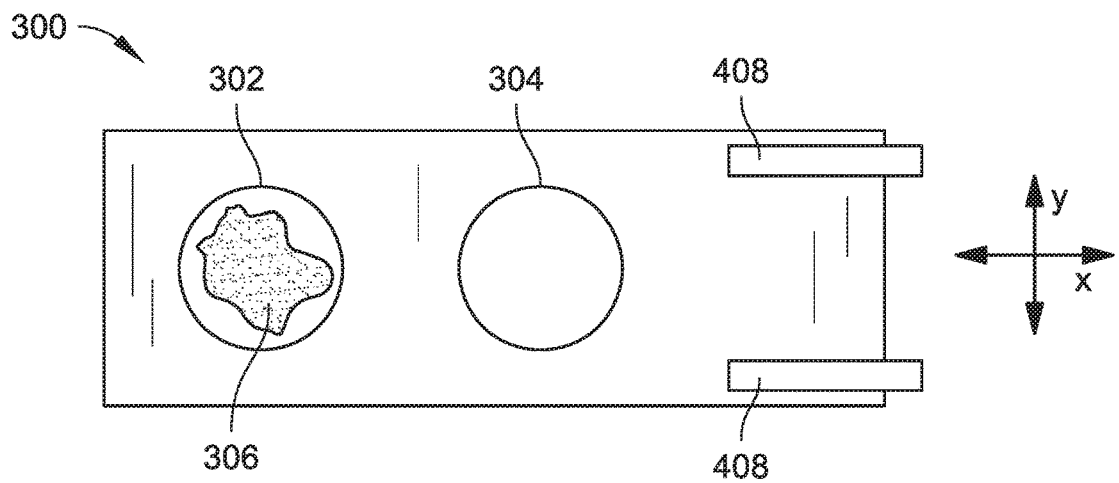

One or more objects 406 in object repository 402 can be provided as any object as exemplarily described above (e.g., as object 200, object 300, or the like). For example, each object 406 may be provided as a card 300, as discussed above. Accordingly, the robotic manipulator 400 can be configured to remove the card 300 from the object repository 402, move a removed card 300 into or out of operable proximity with the inspection system 104, move a removed card 300 into or out of operable proximity with the sample generation system 106, or the like or any combination thereof. When a card 300 is in operable proximity with the inspection system 104, the inspection system 104 can be operated to obtain information that can be used to identify the card 300, capture imagery of the card 300, etc., as discussed above. When a card 300 is in operable proximity with the sample generation system 106, the sample generation system 106 can be operated to remove a portion of the card 300, as discussed above. Referring to FIGS. 4A and 4B, the robotic manipulator 400 may include, as an end effector, a set of mechanical grippers such as mechanical grippers 408 and 410. The mechanical grippers 408 and 410 may be actuated, as is known in the art, to move along the directions indicated by arrows 412 to grip and release the card 300. Generally, the card 300 is somewhat flexible, but stiff enough to retain a generally flat shape regardless of the orientation in which it is held by the robotic manipulator.

Figure 5:
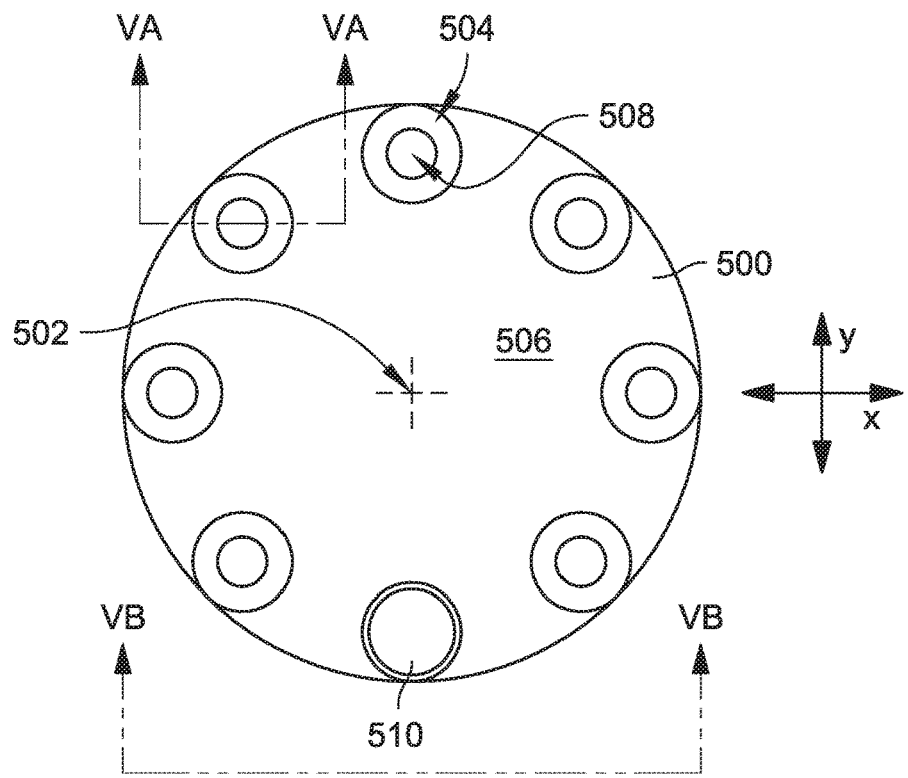
FIGS. 5, 5A and 5B are schematic views illustrating another embodiment of the object handling system in the system shown in FIG. 1. In particular.
Figure 5A:
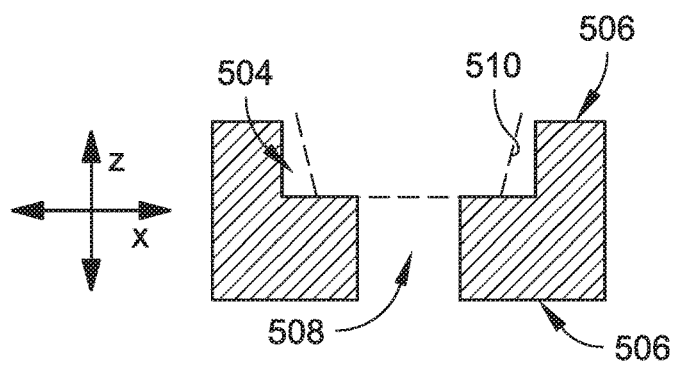
Figure 5B:
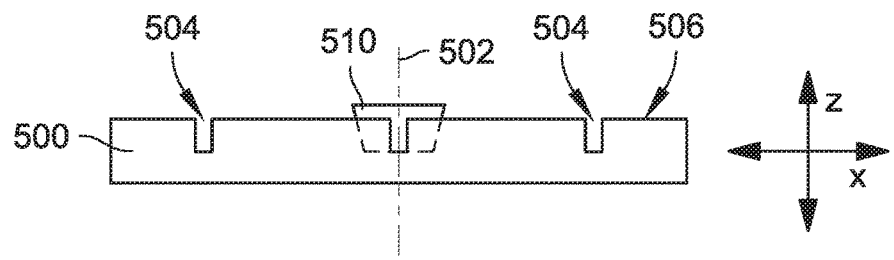

In another embodiment, the object handling system 102 includes a carrier plate system having a carrier plate as exemplarily shown in FIG. 5 at 500. As exemplarily shown in FIGS. 5 and 5A, the carrier plate 500 is generally circular in shape, and includes a plurality of recesses 504 formed in an upper surface 506 thereof, as well as a plurality of through-holes 508 extending from a bottom surface 510 of the carrier plate 500 to respective bottom surfaces of the recesses 504. As shown in FIGS. 5 and 5B, the recesses 504 extend to an outer side surface of the carrier plate 500. Although FIGS. 5 and 5B illustrate only one recess 504 having an object 510 received therein, it will be appreciated that one or more recesses 504 may each an object 510 received therein.

The object 510 can be provided as any object as exemplarily described above (e.g., as object 200, object 300, or the like). For example, in the illustrated embodiment, the object 510 may be provided as pressed pellet or fused bead, as discussed above with respect to object 200. The size and shape of the recesses 504 are selected such that an object, such as object 200, can be received therein. For example, a recess 504 may have a size and shape which generally corresponds to the size and shape of the object 510, so as to allow an object 510 to be inserted into, and removed from, a recess 504. As shown in FIG. 5A, each through hole 508 intersects the bottom surface of a respective recess 504 at an opening that is smaller in size than an object 510 that is received within the recess 504. Accordingly, an object 510 may be received in a recess 504 (e.g., so as to rest on a bottom surface of the recess 504) but not fall into the through hole 508.

Although not shown, the carrier plate system may further include an actuator (e.g., a servo motor) coupled to the carrier plate 500 (e.g., by an axle, at axis 502, passing through the center of the carrier plate 500) and configured to rotate (e.g., continuously, in an indexed manner, or any combination thereof) the carrier plate 500 about the axis 502. Further, the carrier plate system may be arranged relative to one or more of the inspection system 104 and the sample generation system 106 so that an object 510 received within a recess 504 may be moved into or out of operable proximity with the inspection system 104, into or out of operable proximity with the sample generation system 106, or the like or any combination thereof, when the actuator is operated to rotate the carrier plate 500 about axis 502.

In the embodiments discussed above, the object handling system 102 can include a robotic manipulator (e.g., and, optionally, an object repository), or a carrier plate system. In another embodiment, the object handling system 102 can include a robotic manipulator, a carrier plate system and, optionally, an object repository. In this embodiment, objects such as objects 510 may be stored at the object repository, and the robotic manipulator may be provided to transfer an object 510 from the object repository into an empty recess 504 of the carrier plate 500 in the carrier plate system. The robotic manipulator may also transfer an object 510 from a recess 504 of the carrier plate 500 in the carrier plate system to the object repository.

Embodiments Concerning the Sample Generation System

Figure 6:
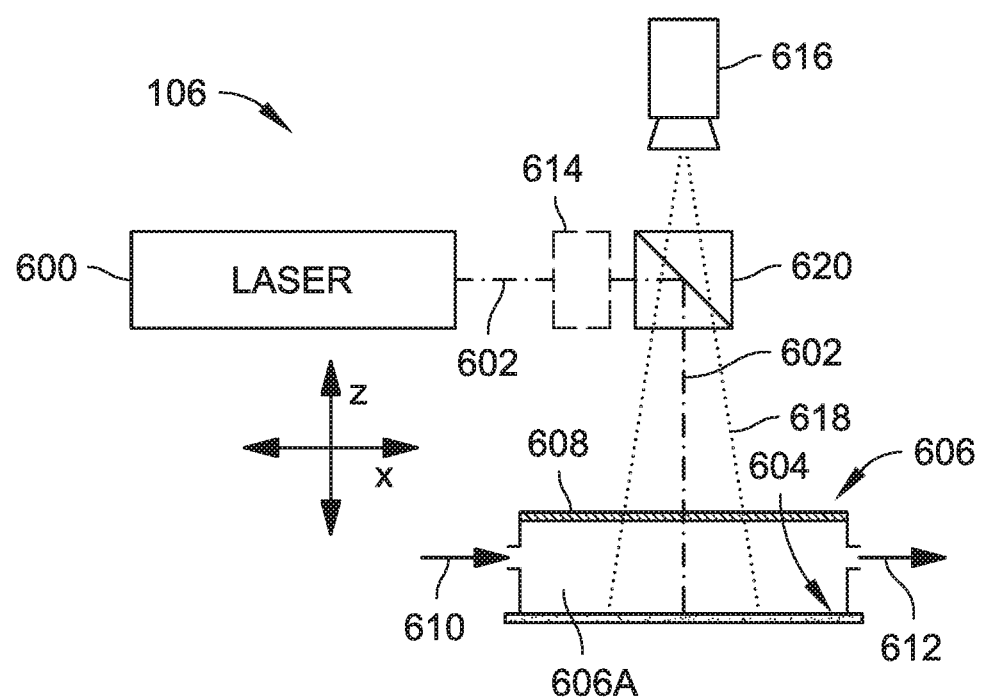
FIG. 6 is a schematic view illustrating a sample generation system, according to one embodiment.

Referring to FIG. 6, the sample generation system 106 may, according to one embodiment, include a laser 600 operative to produce a laser beam, which may be propagated along a beam path 602, to irradiate a surface 604 of the object to be sampled. The sample generation system 106 includes a sample chamber 606 defining an interior space or region 606a within which an aerosol containing a plume of material, ablated by the laser beam, can be captured for transport to the sample analysis system 108. The sample chamber 606 is provided as an "open" sample chamber, which does not fully enclose the object to be sampled. By contrast, a "closed" sample chamber is known to be a sample chamber that fully encloses an object to be sampled. In one embodiment, the sample chamber 606 contacts the surface 604 of the object to be sampled (e.g., to provide an airtight or at least substantially airtight seal between the sample chamber 606 and the surface 604). In another embodiment, the sample chamber 606 does not contact the surface 604 of the object to be sampled. Rather, the sample chamber 606 is placed in very close proximity (e.g., within 300 μm, 250 μm, 200 μm, 150 μm, 100 μm, 75 μm, 50 μm, or the like) of the surface 604 of the object to be sampled. As will be discussed in greater detail below, the sample chamber 606 may be part of a placement system configured to position an object to be sampled relative to the sample chamber 606 in an accurate and repeatable manner.

The sample chamber 606 can include a transmission window 608 (e.g., formed of a material such as glass, sapphire, or other material that is suitably transparent to the laser beam). The sample chamber 606 typically includes one or more inlets to introduce purge gas, carrier gas, or the like, into the interior 606a of the sample chamber 606 (as indicated by arrow 610) and one or more outlets though which purge gas, carrier gas, or an aerosol containing material ablated or otherwise dissociated from the surface 604 of the object to be sampled can be transported out of the sample chamber 606 (e.g., as indicated by arrow 612). Although not illustrated, the aforementioned transport conduit 110 may be coupled to an outlet to transport the aerosol from the sample chamber 606 to the sample preparation system and/or the sample analysis system 108.

The sample generation system 106 may optionally include optics 614 disposed along the beam path 602 to focus, expand, collimate, shape, polarize, filter, split, reflect, diffract, refract, combine, crop, or otherwise modify, condition, direct, monitor or measure laser light generated by the laser 600. Optionally, the optics 614 includes beam steering optics (e.g., fast steering mirrors, mirror galvanometer deflectors, electro-optic deflectors, and/or acousto-optic deflectors), or the like or any combination thereof, which can be operative to impart movement of the beam path 602 relative to the surface 604 of the object to be sampled.

The sample generation system 106 may further include an optical microscope system 616 that is in optical communication with the interior 606a of the sample chamber (e.g., via the transmission window 608). The optical microscope system 616 may include one or more cameras (e.g., including one or more image sensors such a CCD sensor, a CMOS sensor, or the like or any combination thereof) and may capture imagery (e.g., in the form of still images, video, or a combination thereof) of the surface 604 through the transmission window 608 and output (e.g., to the controller 112, a computer monitor of the user interface 116, or the like or any combination thereof) image data corresponding to the captured imagery. When the surface 604 is exposed to the interior 606a of the sample chamber, the surface 604 is arranged within a field-of-view 618 of the optical microscope system 616. The sample generation system 106 may further include optics 620 (e.g., a beam splitter, a beam combiner, a half-silvered mirror, or the like or any combination thereof) to combine the beam path 602 with the field-of-view 620 of optical microscope system 616. If image data is output to the controller 112, the controller 112 may, in turn, process the image data and output data corresponding to the received image data to be communicated to a user (e.g., via a computer monitor of the user interface 116).

Embodiments Concerning the Placement System

Figure 7A:
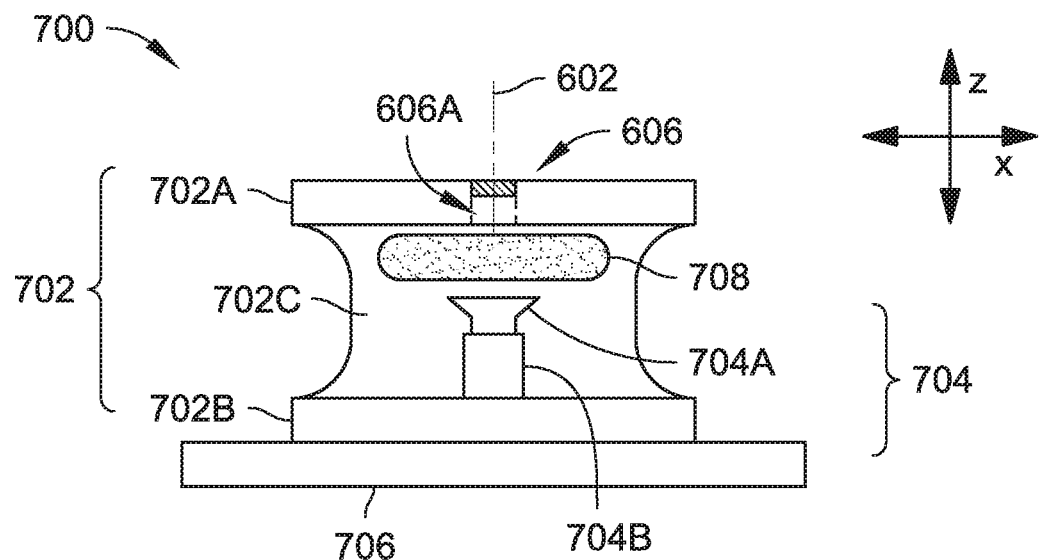
FIGS. 7A and 7B are schematic views illustrating a placement system, according to one embodiment, and an operation thereof.
Figure 7B:
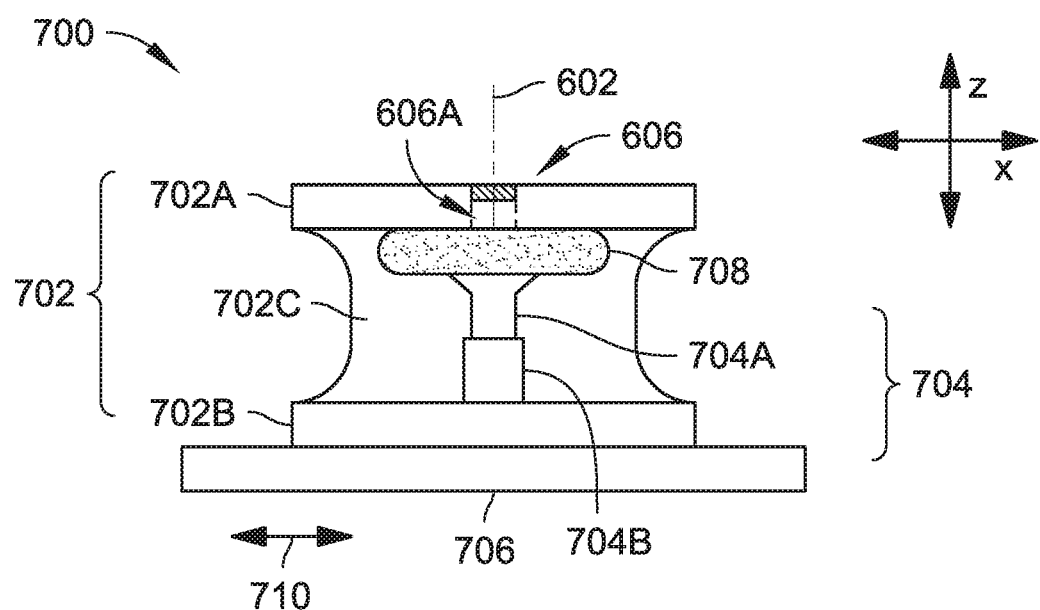

As mentioned above, the sample chamber 606 is part of a placement system configured to position an object to be sampled relative to the sample chamber 606 in an accurate and repeatable manner. In one embodiment, and with reference to FIG. 7, a placement system may be provided as placement system 700. Placement system 700 may include a frame 702, an actuator assembly 704 and, optionally, a table 706.

The frame 702 is configured to hold, fix or otherwise support the sample chamber 606 (of which only the transmission window 608 and the interior 606a are illustrated) in a fixed positional relationship with the actuator assembly 704. In one embodiment, the frame 702 and the sample chamber 606 may be formed as mechanically separate components that may be coupled together (e.g., by means of one or more screws, pins, clamps, adhesive, welding, or the like or any combination thereof) and, optionally, removed from one another (e.g., in a manner that does not degrade either the frame 702 or the sample chamber 606). In another embodiment, however, the frame 702 and the sample chamber 606 may be integrally formed together. Likewise, in one embodiment, the frame 702 and the actuator assembly 704 may be formed as mechanically separate components that may be coupled together (e.g., by means of one or more screws, pins, clamps, adhesive, welding, or the like or any combination thereof) and, optionally, removed from one another (e.g., in a manner that does not degrade either the frame 702 or the actuator assembly 704). In another embodiment, however, the frame 702 and the actuator 704b may be integrally formed together. As exemplarily illustrated, the frame 702 can be considered as including a first frame portion 702a (where the sample chamber 606 is located), a second frame portion 702b (where the actuator assembly 704 is located) and a third frame portion 702c extending from the first frame portion 702a to the second frame portion 702b.

In one embodiment, the actuator assembly 704 (e.g., an actuated pin assembly) can include a pin 704a and an actuator 704b (e.g., a pin actuator). The actuator 704b can be configured to move the pin 704a between a first positional state (e.g., shown in FIG. 7) and a second positional state (e.g., shown in FIG. 8). The actuator 704b may be provided as any suitable actuator, such as a piston actuator, an electric actuator (e.g., an electric motor, a stepper motor, a servo motor, a comb drive, etc.), a hydraulic actuator (e.g., a hydraulic cylinder, etc.), a pneumatic actuator (e.g., operating from a source of compressed air, etc.), a magnetic actuator (e.g., a solenoid, etc.), a mechanical actuator, a threaded actuator, or the like or any combination thereof.

Figure 8:
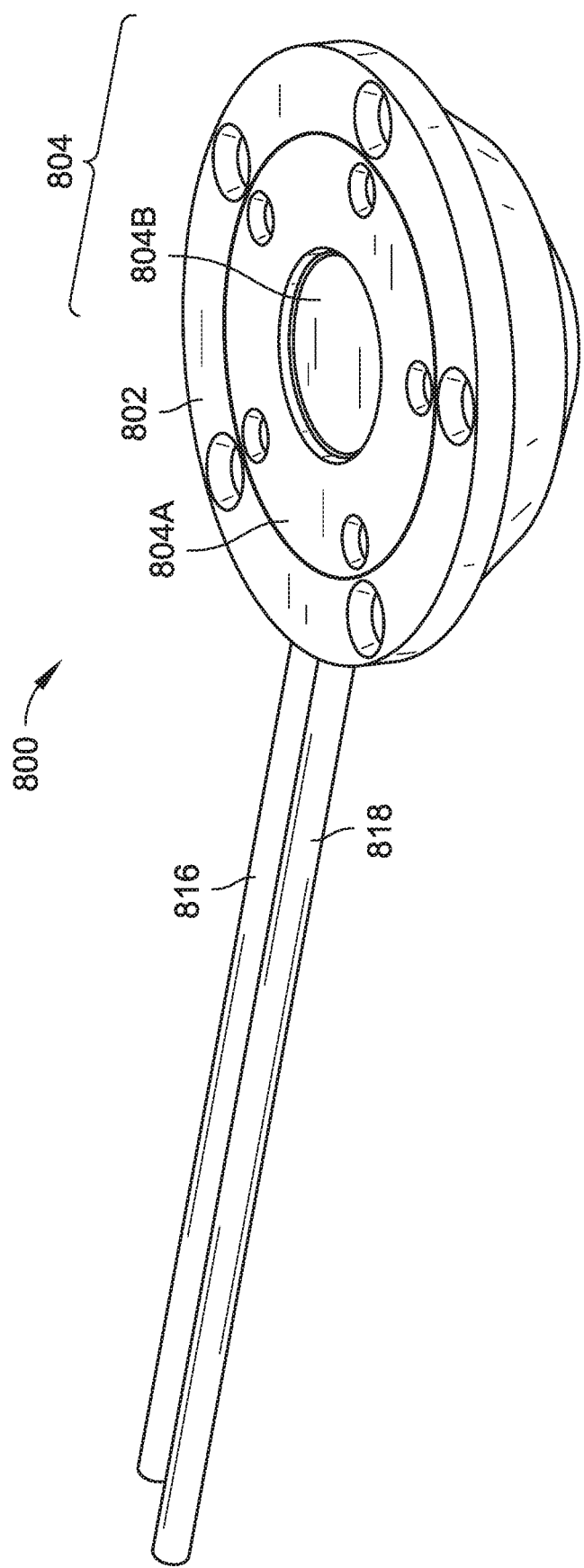
FIGS. 8 and 9 are perspective views illustrating a sample chamber according to one embodiment.

When the pin 704a is at the first positional state as shown in FIG. 7, an object to be sampled (e.g., identified at 708) is positioned within a space or region between, and is spaced apart from, the sample chamber 606 and the pin 704a. Alternatively, the object 708 may contact the pin 704a, instead of being spaced apart therefrom. Although not shown, the object 708 (e.g., which can be provided as any object as exemplarily described above, as object 200, object 300, or the like, or any combination thereof) can be moved into, positioned, or moved out of the region between the sample chamber 606 and the pin 704a by the object handling system 102 (e.g., according to any of the embodiments described above). When the pin 704a is at the second positional state as shown in FIG. 8, the object 708 contacts the actuator assembly 704 and the sample chamber 606. When the object 708 contacts the pin 704a and the sample chamber 606, the object 708 can be considered to be in operable proximity with the sample generation system 106, as discussed above.

Although not shown, the object 708 (e.g., which can be provided as any object as exemplarily described above, as object 200, object 300, or the like, or any combination thereof) can be moved into, positioned, or moved out of the region between the sample chamber 606 and the pin 704a by the object handling system 102 (e.g., according to any of the embodiments described above). Thus, the distance between the pin 704a and the sample chamber 606 (when the pin 704a is at the first positional state) may vary, depending upon the size of the object 708, the object handling system 102 used to move the object 708, etc. For example, if the object 708 is a card such as card 300, and if the card is gripped by an end effector such as mechanical grippers 408 and 410, then the distance between the pin 704a (at the first positional state) and the sample chamber 606 may be slightly larger than the thickness of the card. If the object 708 is provided as an object such as the aforementioned pellet or bead 200, and if the pellet or bead is received within a recess 504 of the carrier plate 500, then the distance between the pin 704a (at the first positional state) and the sample chamber 606 may be slightly larger than the carrier plate 500. In implementations, a sample and/or object 708 can include and/or can be disposed on and/or part of a metal (e.g., copper disk), a plastic/polymer, a glass, a pressed soil, and/or a pressed food. It is contemplated that the object 708 and/or sample can include a variety of other materials.

In transitioning from the first positional state to the second positional state, the actuator 704b is operated to raise the pin 704a to press against the bottom of the object 708 and raise the object 708, such that the object 708 (i.e., a surface of the object 708 corresponding to the surface 604, shown in FIG. 6) contacts a bottom portion of the sample chamber 606 and is pressed against the sample chamber 606. As mentioned above, the surface 604 contacts the sample chamber 606 so as to provide an airtight or at least substantially airtight seal between the sample chamber 606 and the surface 604. To facilitate creation of a suitably airtight seal, the sample chamber 606 may include a sealing member (e.g., a gasket, an o-ring, or the like) arranged so as to contact the surface 604 when the pin 704a presses the object 708 against the sample chamber 606.

If the object 708 is a card such as card 300, and if the card is gripped by an end effector such as mechanical grippers 408 and 410, the object 708 may flex somewhat (e.g., relative to the end effector) when the pin 704a transitions from the first positional state to the second positional state, while the end effector remains unmoved (or at least substantially unmoved). If the object 708 is a card such as card 300, then a perimeter delineated by the gasket or other sealing member should lie on or outside the perimeter of the first region 302, on or outside the perimeter of the second region 304, or simultaneously on or outside the perimeter of the first region 302 and the second region 304. To facilitate creation of a suitably airtight seal, the sample chamber 606 may include a gasket (e.g., an o-ring, or the like) or other sealing member (not shown) arranged so as to contact the surface 604 when the pin 704a presses the object 708 against the sample chamber 606.

If the object 708 is an object such as the aforementioned pellet or bead 200, and if the pellet or bead is received within a particular recess 504 of the carrier plate 500, then the pin 704a may be configured to be inserted into a through hole 508 associated with (e.g., extending from) the particular recess 504. When the pin 704a transitions from the first positional state to the second positional state, the pin 704a enters into the through hole 508 to press against the bottom of the pellet or bead and raise the pellet or bead off the bottom surface of the particular recess 504 such that it contacts a bottom portion of the sample chamber 606.

In transitioning from the second positional state to the first positional state, the actuator 704b is operated to lower the pin 704a such that the object 708 is lowered (e.g., under the influence of gravity) away from the sample chamber 606. If the object 708 is a card such as card 300, and if the card is gripped by an end effector such as mechanical grippers 408 and 410, the object 708 may flex somewhat (e.g., relative to the end effector) when the pin 704a transitions from the second positional state to the first positional state, while the end effector remains unmoved (or at least substantially unmoved). If the object 708 is an object such as the aforementioned pellet or bead 200, when the pin 704a transitions from the second positional state to the first positional state, the pin 704a is lowered to exit the through hole 508, thereby lowering the pellet or bead back onto the bottom surface of the particular recess 504.

The table 706 is coupled (e.g., so as to be positionally fixed, or at least substantially so) to the frame 702. In one embodiment, the table 706 is provided as or more motion stages which are operative to move the frame 702 (and, thus, the sample chamber 606 and the actuator assembly 704) relative to the beam path 602 and the field of view 618. The motion stage(s) may be configured to linearly translate the frame 702 (e.g., along an X-, Y- or Z-axis, or any combination thereof), to rotate the sample chamber (e.g., along the X-, Y- or Z-axis, or any combination thereof), or the like or any combination thereof. Translation or rotation may be accomplished by manually moving one or more stages, using one or more motors, or the like or any combination thereof. In the FIGS. (e.g., including FIGS. 4A, 4B, 5, 5A, 5B, 6, 7A and 7B), the X-, Y- and Z-axes are orthogonal to one another. In another embodiment, however, the table 706 may be provided as a stationary table (i.e., a table which is incapable of moving the frame 702.

Embodiments Concerning Reproducibility

Generally, the amount and quality of material removed from an object to be sampled is highly dependent upon the spot size of laser pulses used to sample the object. Thus, characteristics of a sample obtained from the object are highly dependent upon the spot size of laser pulses used to sample the object. To ensure that samples are obtained in a consistent and reproducible manner each time an object 708 is brought into operable proximity with the sample generation system 106 (herein referred to as a "sampling event"), it can be desirable to ensure that the spot size of laser pulses used during one sampling event is the same as (or at least substantially the same as) spot size of laser pulses used during another sampling event.

In one embodiment, ensuring consistent spot size across multiple sampling events can be made possible by fixing the position of the beam waist located within the sample generation system 106 and by ensuring that the object 708 is pressed against the sample chamber 606 (e.g., against the aforementioned gasket of the sample chamber 606) by the same amount during each of multiple sampling events. For example, the pin actuator 704a can be provided as a pneumatic actuator (e.g., operating from a source of air that has been pressurized to a predetermined pressure). Such a pneumatically-operated pin actuator 704a then simply presses the object 708 against the sample chamber 606 (e.g., at the gasket of the sample chamber 606) with a pressure that corresponds to the predetermined pressure. As another example, the pin actuator 704a can be provided as any suitable actuator, and the placement system 700 may further include a feedback mechanism such as a touch probe, etc., arranged to contact the surface 604 of the object 708 when the object 708 is pressed against the sample chamber 606. A signal output from the feedback mechanism may then be used to control the operation of the pin actuator 704a (e.g., to prevent the pin actuator 704a from pressing against the object 708).

In another embodiment, ensuring consistent spot size across multiple sampling events can be made possible by determining where the surface 604 of the object 708 lies (e.g., in relation to a focal plane or an image plane associated with the beam path 602 of the sample generation system 106) after the object 708 has been pressed against the sample chamber 606 (e.g., at the gasket of the sample chamber 606) and then varying the position where the beam waist will be located within the sample generation system 106 based on the determined location of the surface 604. Determining the location of the surface 604 of the object 708 (e.g., in relation to a focal plane or an image plane associated with the beam path 602 of the sample generation system 106) can be accomplished by capturing imagery of the surface 604 of the object 708 (e.g., using the optical microscope system 616 and processing the captured imagery in any suitable manner known in the art. Determining the location of the surface 604 of the object 708 (e.g., in relation to a focal plane or an image plane associated with the beam path 602 of the sample generation system 106) can also be accomplished using a feedback mechanism such as a touch probe, etc., as discussed above.

Embodiments Concerning Scanning

A scan can be performed by operating the beam steering optics to move the beam axis (e.g., as discussed above), by operating one or more motion stages of the table 706 (e.g., as discussed above), or the like or any combination thereof. If one or more motion stages of the table 706 is operated to move the frame 702 (e.g., from an initial position) in a manner corresponding to the desired beam trajectory, the object 708 may or may not be held or supported by the object handling system 102. For example, if the object 708 is a card such as card 300, and if the card is gripped by an end effector such as mechanical grippers 408 and 410, the card may slide between the grippers 408 and 410 as the table 706 moves during a sampling event. Alternatively, during a sampling event, the end effector may be actuated—as known in the art—to release the card therefrom before the table 706 is operated to perform the scan. Thereafter, one or more motion stages of the table 706 may be operated to perform the scan and, afterwards, the one or more motion stages of the table 706 may be operated to move the frame 702 back to the initial position. Once back at the initial position, the grippers 408 and 410 may be actuated to grip the card. In another embodiment, one or more components of the object handling system 102 (e.g., a robotic manipulator, a conveyor system, a carrier plate system, etc.) may be carried by the table 706, in addition to the frame 702.

Example Embodiment Concerning the Sample Chamber

Figure 9:
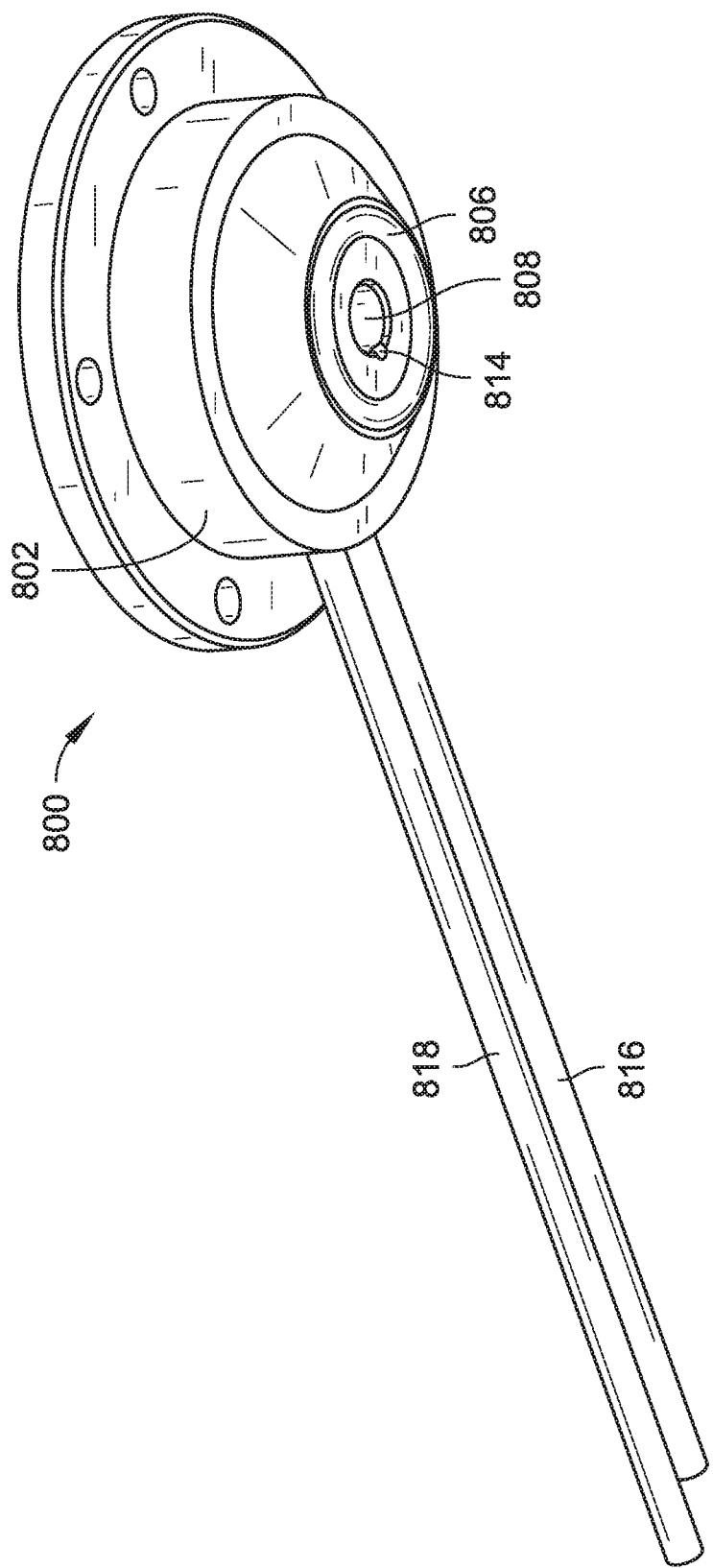
Figure 10:
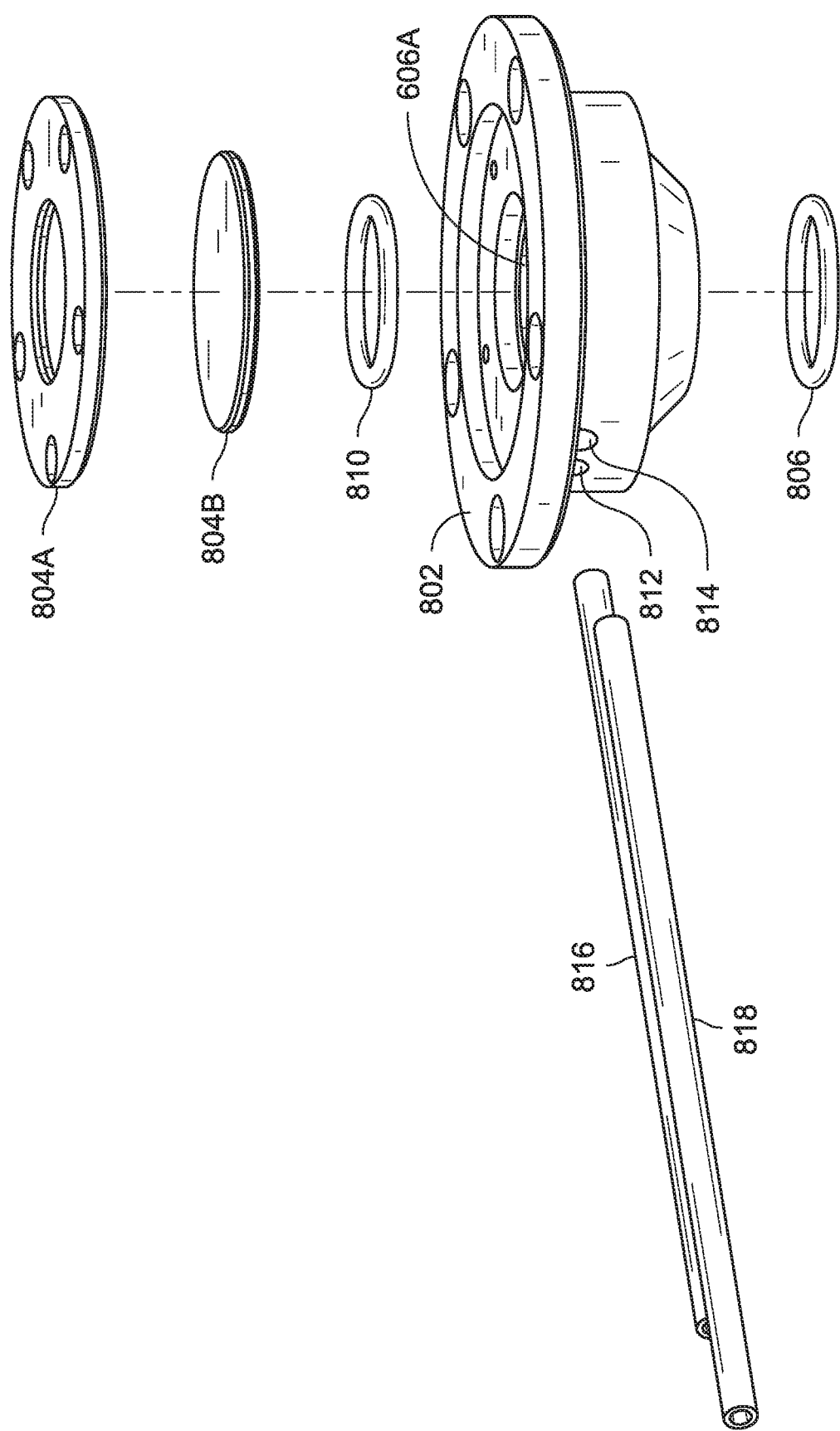
FIG. 10 is an exploded perspective view illustrating the sample chamber shown in FIGS. 8 and 9.

As mentioned above, the sample chamber 606 is provided as an open sample chamber that defines an interior space or region 606a within which an aerosol containing a plume of material, ablated by the laser beam, can be captured for transport to the sample analysis system 108. In one embodiment, the sample chamber 606 may be provided as sample chamber 800 variously illustrated in FIGS. 8 to 10. Referring to FIGS. 8 to 10, the sample chamber 800 may include a sample chamber body 802, a transmission window assembly 804, and a gasket 806.

Generally, the sample chamber body 802 defines the aforementioned interior 606a interior space or region 606a within which an aerosol containing a plume of material, ablated by the laser beam, can be captured. The interior 606a of sample chamber body 802 can have a tapered or frustoconical shape that intersects at a lower surface of the sample chamber body 802 at an opening 808 (also referred to herein as a "chamber aperture"). Generally, dimensions of the interior 606a can be selected to have a suitably small or minimal volume (e.g., to reduce or minimize the volume that should be purged from the interior 606a before an object brought into operable proximity with the sample generation system 106 is sampled). Moreover, dimensions of the interior 606a can be selected to ensure that the distance between the chamber aperture 808 and the transmission window 804b is sufficiently large such that the transmission window 804b is not damaged during a sampling event. Damage to the transmission window 804b can occur as a result of being irradiated by a laser beam generated by the laser 600, as a result of accumulating debris (e.g., containing material ejected from the object during sampling), or the like or any combination thereof. The sample chamber body 802 may be coupled to the aforementioned frame (identified here at 702) by one or more screws, formed in the frame 702 and sample chamber body 802, respectively).

The transmission window assembly 804 includes a bracket 804a and a transmission window 804b. The transmission window 804b is typically formed of a material such as glass, sapphire, or other material that is suitably transparent to the laser beam 1100 generated by the laser 600. The bracket 804a can be configured to be coupled to the sample chamber body 802 (e.g., by screws, not shown) to thereby trap the transmission window 804b between the bracket 804a and the sample chamber body 802. As shown in FIG. 10, the sample chamber 800 may further include a gasket (e.g., o-ring, or the like) or other sealing member configured provide an airtight or at least substantially airtight seal between the sample chamber body 802 and the surface transmission window 804b.

The gasket 806 (e.g., an o-ring, or the like) or other sealing member may be provided to create a suitably airtight seal during a sampling event, as discussed above.

Referring to FIG. 10, the sample chamber 800 includes one or more inlets, such as inlet 812 to introduce purge gas, carrier gas, or the like, into the interior 606a. The inlet 812 extends through the sample chamber body 802 along an axis (also referred to herein as an "inlet axis") that is offset from an axis of the interior 606a (parallel to the Z-axis). Accordingly, the inlet axis can be characterized as intersecting a sidewall of the sample chamber body 802 defining the interior 606a. The angle between the inlet axis and a line tangent to the point where the inlet axis intersects the sidewall of the sample chamber body 802 defining the interior 606a (i.e., when viewed in the X-Y plane), also referred to herein as the "inlet angle," can be greater than or less than 90°. For example, the inlet angle can be 2°, 5°, 10°, 15°, 20°, 25°, 30°, 35°, 40°, 45°, 50°, 55°, 60°, 65°, 60°, 65°, 70°, 75°, 80°, 85°, 89°, 91°, 95°, 100°, 105°, 110°, 115°, 120°, 125°, 130°, 135°, 140°, 145°, 150°, 155°, 160°, 165°, 170°, 175°, 178°, etc., or between any of these values. Configured as described above, gas introduced into the interior 606a can, if introduced at a sufficiently high flow rate, swirl within the interior 606a, along the sidewalls of the interior 606a, downwardly, toward the chamber aperture 808 to create a vortex within the interior 606a. Although the inlet axis has been described as being offset from the axis of the interior 606a (i.e., to intersect the axis of the interior 606a), it will be appreciated that the outlet axis may be aligned with the axis of the interior 606a (i.e., to intersect the axis of the interior 606a).

Referring to FIGS. 9 and 10, the sample chamber 800 includes one or more outlets, such as outlet 814 for receiving purge gas, carrier gas, or an aerosol containing material ablated or otherwise dissociated from the surface of the object to be sampled, can be transported (e.g., from the interior 606a, due to a flow of gas such as He or Ar introduced into the interior 606a by the inlet 812). As best shown in FIGS. 9 and 10, the outlet 814 extends through the sample chamber body 802 along an axis (also referred to herein as an "outlet axis") that intersects the axis of the interior 606a (parallel to the Z-axis). Accordingly, the outlet 814 intersects a sidewall of the sample chamber body 802 defining the interior 606a as well as a lower surface of the sample chamber body 802 (e.g., at a peripheral region of the chamber aperture 808). In other embodiments, however, the outlet 814 may intersect only the sidewall of the sample chamber body 802 defining the interior 606a, or only the lower surface of the sample chamber body 802 (e.g., at a peripheral region of the chamber aperture 808). Although the outlet axis has been described as being aligned with the axis of the interior 606a (i.e., to intersect the axis of the interior 606a), it will be appreciated that the outlet axis may be offset from the axis of the interior 606a (e.g., in the same manner as described above with respect to the inlet axis).

Referring to FIGS. 8 to 10, the sample generation system 106 may also include an end of inlet conduit 816 coupled to the sample chamber body 802 such that an interior of the inlet conduit 816 is in fluid communication with the inlet 812. The inlet conduit 816 may be coupled to one or more sources of gas (e.g., pressurized gas, gas at atmospheric pressure), such as a helium (He) source, a nitrogen ($N_2$) source, an argon (Ar) source, or the like or any combination thereof. In order to couple the inlet conduit 816 to multiple sources, another end of the inlet conduit 812 (e.g., an end opposite to the end coupled to the sample chamber body 802) may be coupled to an output of a multichannel valve (not shown). The valve may have multiple inputs (e.g., each coupled to a different source of pressurized gas) and a selector (e.g., a pneumatic actuatable selector, etc.), as is known in the art, configured to selectively place one of the inputs in fluid communication with the output. Accordingly, gas can be transported from one or more sources into the interior 606a via the inlet conduit 816.

Referring to FIGS. 8 to 11, an end of the outlet conduit 818 may be coupled to the sample chamber body 802 such that an interior of the outlet conduit 818 is in fluid communication with the outlet 814. In one embodiment, another end of the outlet conduit 818 (e.g., an end opposite to the end coupled to the sample chamber body 802) may be coupled to an input of the sample analysis system 108 (or to an input of a sample preparation system that is not incorporated into the sample analysis system 108). Accordingly, an aerosol containing a plume of material, ablated by the laser beam, captured within the interior 606a received within the outlet 818, can be transported to the sample analysis system 108 (or to an input of a sample preparation system that is not incorporated into the sample analysis system 108) via the outlet conduit 818.

In another embodiment, the other end of the outlet conduit 818 may be coupled to an input of a multichannel valve (not shown) which, in turn includes a first output in fluid communication with the input of the sample analysis system 108 (or to the input of a sample preparation system that is not incorporated into the sample analysis system 108) and a second output in fluid communication with an exhaust system (not shown). The exhaust system may include one or more filters configured to trap any vapors, particles, or the like or any combination thereof, which might be transported by the outlet conduit 818. The first output may thus be directly coupled to the input of the sample analysis system 108 (or to the input of a sample preparation system that is not incorporated into the sample analysis system 108) or indirectly coupled thereto (e.g., by one or more conduits, tubes, etc.). Likewise, the second output may thus be directly coupled to the exhaust system or indirectly coupled thereto (e.g., by one or more conduits, tubes, etc.). Similar to the valve discussed above with respect to the inlet conduit 816, the valve in the present embodiment may include a selector (e.g., a pneumatic actuatable selector, etc.), as is known in the art, configured to selectively place one of the first and second outputs in fluid communication with the input. Generally, the outlet conduit 818 and the inlet conduit 816 may be coupled to a common multichannel valve or may be coupled to different multichannel valves. For purposes of discussion herein, the multichannel valve(s) may be considered to be a part of the sample generation system 106.

Example Embodiment Concerning the Placement System

As mentioned above, the sample chamber 606 is part of a placement system configured to position an object to be sampled relative to the sample chamber 606 in an accurate and repeatable manner. In one embodiment, the placement system 700 may be provided as placement system 700 variously illustrated in FIGS. 11 to 12.

In the illustrated embodiment, the first frame portion 702 may be configured (e.g., with one or more channels, such as channel 1302) to accommodate inlet conduit 816 and outlet conduit 818. In the embodiment shown in FIG. 11, the actuator 704b is provided as a double-acting pneumatic actuator and, therefore, includes two actuator inlets 1304 and 1306 configured to be coupled to a source of pressurized gas (e.g., via conduits, not shown) as is known in the art.

Figure 11:
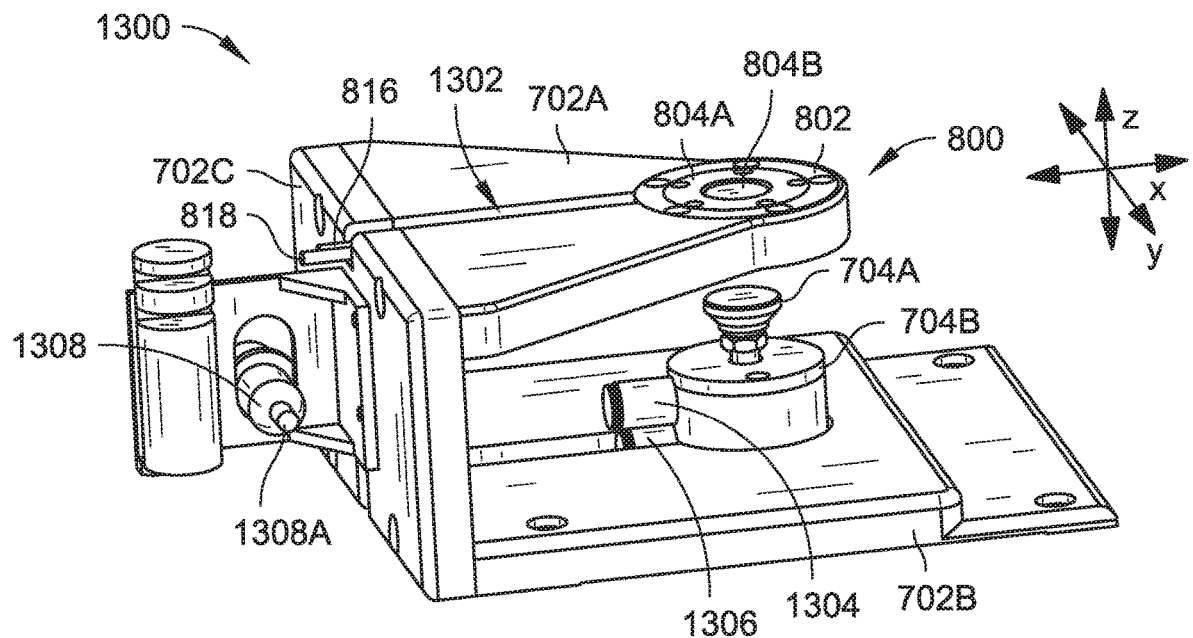
FIGS. 11 and 12 are perspective views illustrating a placement system according to one embodiment.
Figure 12:
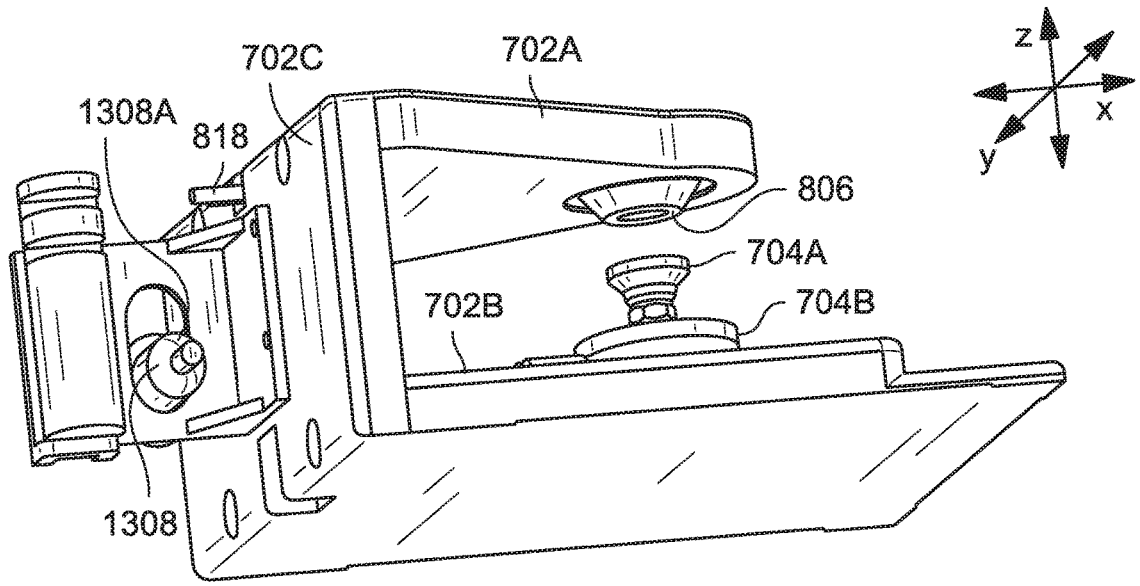

Also illustrated in FIGS. 11 and 12 is an exhaust system 1308 (e.g., a filter) having an input identified at 1308a. The input 1308a of exhaust system 1308 may be coupled to the end of the outlet conduit 818 not coupled to the sample chamber body 802 (e.g., by a flexible conduit or tube, not shown).

Example Embodiment of System Shown in FIG. 1

Figure 13:
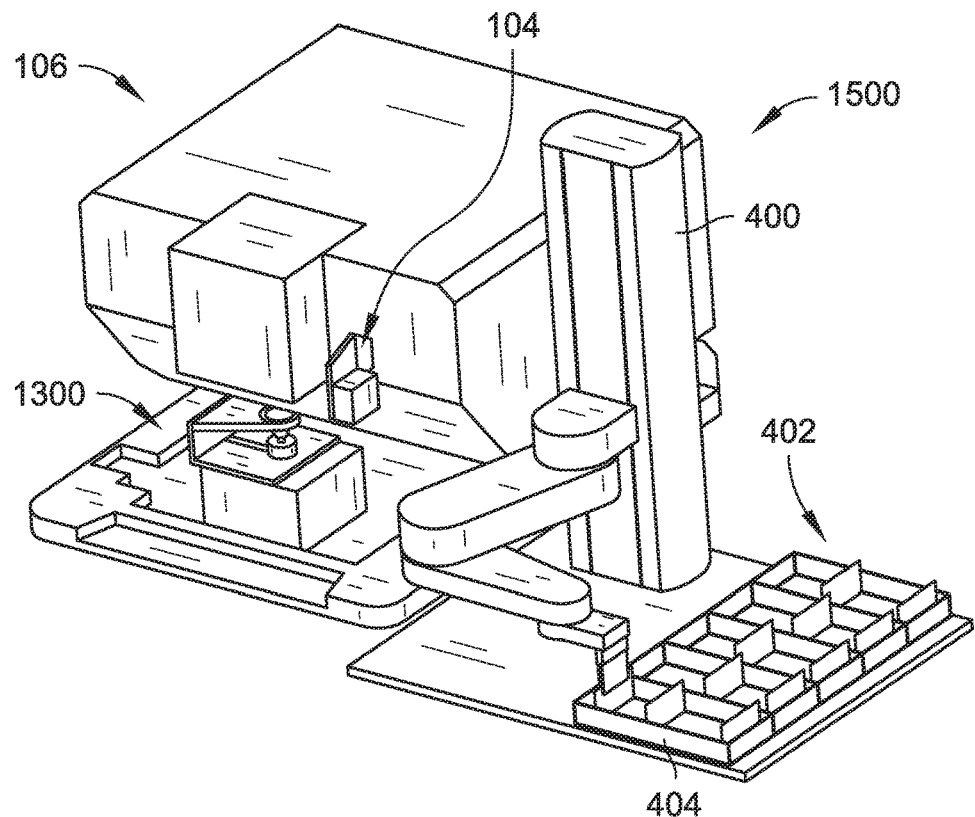
FIGS. 13 and 14 are perspective views illustrating a system for facilitating automated handling, sampling and analysis of objects, according to one embodiment, and an operation thereof.
Figure 14:
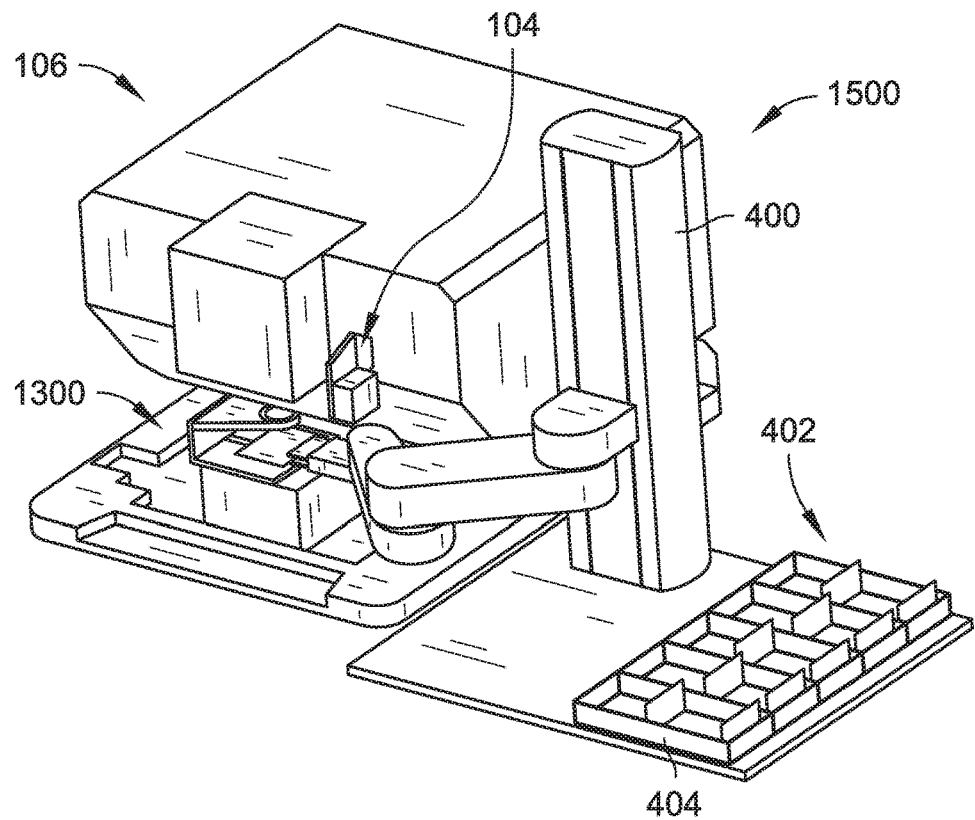
Figure 15:
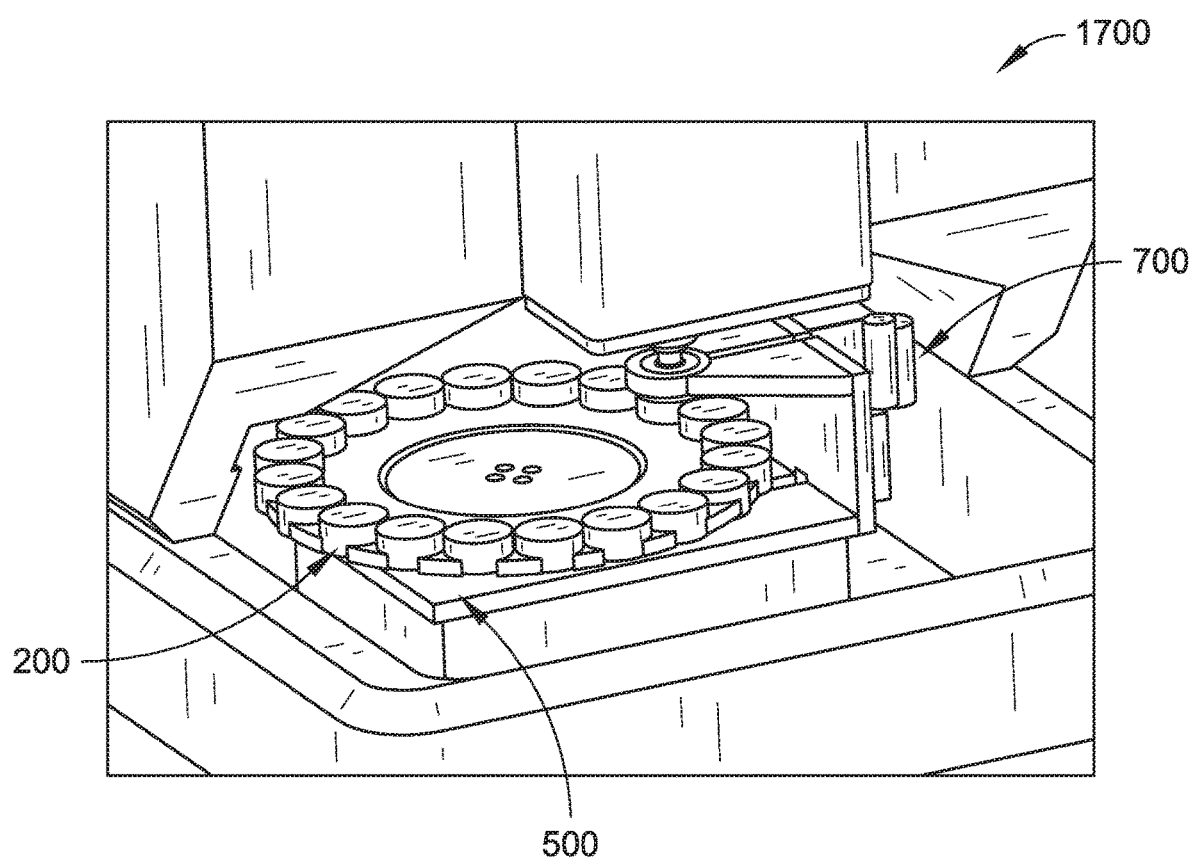
FIG. 15 is a perspective view illustrating a sample generation system according to one embodiment.

In one embodiment, the system 100 shown in FIG. 1 can be provided as system 1500, shown in FIGS. 13 and 14. Referring to FIGS. 13 and 14, the system 1500 includes, as an object handling system, a manipulator 400 and object repository 402. As shown, the manipulator 400 is provided as a robotic arm, and the object repository 402 includes a plurality of storage units 404 (e.g., bins or trays). The system 1500 also includes, as part of the sample generation system 106, a laser and optics such as provided by the NWR193, NWR213, NWR266, NWRFEMTO, MIR10 (all manufactured by ESI); the ANALYTE EXCITE EXCIMER LA SYSTEM, ANALYTE G2 EXCIMER LA SYSTEM, EXCITE PHAROS FEMTOSECOND LA SYSTEM, LSX-213 G2+LASER ABLATION SYSTEM, LSX-266 LASER ABLATION SYSTEM (all manufactured by TELEDYNE CETAC); or the like or any combination thereof. Also as part of the sample generation system 106, the system 1500 may also include the aforementioned placement system 1300. Also illustrated in FIGS. 13 and 14 is the inspection system 104 (e.g., a laser scanner, a two-dimensional imaging camera, or any combination thereof) attached to the sample generation system 106 (to a housing associated with the laser, optics, etc.). In the illustrated embodiment, the object handling system is not carried by the table of the placement system 1300. In another embodiment, however, the one or more components of the object handling system (e.g., the manipulator 400, the object repository 402, or any combination thereof) may be carried by the table.

FIG. 13 illustrates a first system state in which the robotic arm 400 is positioned to remove an object (e.g., a card, such as card 300) from a storage unit 404. FIG. 14 illustrates a second system state in which the robotic arm 400 is holding the object removed from the storage unit 404, and has been operated (e.g., in an automated manner) to transport the held object into operable proximity with the inspection system 104. Although not illustrated, after the held object has been inspected at the inspection system 104, the robotic arm 400 may be operated (e.g., in an automated manner) to transport the held object into the space or region between the pin 704a and sample chamber 800 of the placement system 1300. Thereafter, the actuator 704b may be operated (e.g., in an automated manner) to bring the object into operable proximity with the sample generation system 106. After the object has been sampled, the actuator 704b may be operated (e.g., in an automated manner) to lower the object away from the sample chamber 800 and the robotic arm 400 may be operated (e.g., in an automated manner) to transport the object back to the storage unit 404. In another embodiment, however, the robotic arm 400 may not be operated to transport the object into operable proximity of the inspection system 104 until after the object has been sampled.

In one embodiment, the sample system 100 shown in FIG. 1 can be provided as system 1700, shown in FIGS. 13 and 14. Referring to FIGS. 13 and 14, the system 1500 includes, as an object handling system, a manipulator 400 and object repository 402. As shown, the manipulator 400 is provided as a robotic arm, and the object repository 402 includes a plurality of storage units 404 (e.g., bins or trays). The system 1500 also includes, as part of the sample generation system 106, a laser and optics such as provided by the NWR193, NWR213, NWR266, NWRFEMTO, MIR10 (all manufactured by ESI); the ANALYTE EXCITE EXCIMER LA SYSTEM, ANALYTE G2 EXCIMER LA SYSTEM, EXCITE PHAROS FEMTOSECOND LA SYSTEM, LSX-213 G2+LASER ABLATION SYSTEM, LSX-266 LASER ABLATION SYSTEM (all manufactured by TELEDYNE CETAC); or the like or any combination thereof. Also as part of the sample generation system 106, the system 1500 may also include the aforementioned placement system 1300. Also illustrated in FIGS. 13 and 14 is the inspection system 104 (e.g., a laser scanner, a two-dimensional imaging camera, or any combination thereof) attached to the sample generation system 106 (to a housing associated with the laser). In the illustrated embodiment, the object handling system is not carried by the table of the placement system 1300. In another embodiment, however, the one or more components of the object handling system (e.g., the manipulator 400, the object repository 402, or any combination thereof) may be carried by the table.

Embodiments Concerning Exemplary Processes

Scanning

In one embodiment, when scanning an object such as card 300, a first scan may be performed within the first region 302 and, preferably, within a portion of the first region 302 where a liquid material (e.g., blood, saliva, etc.) has been applied and absorbed into, or otherwise dried on (as indicated at 306) as discussed above. Thereafter, a second scan may be performed within the second region 304 or any other region of the card where no liquid material (e.g., blood, saliva, etc.) has been applied and absorbed into, or otherwise dried upon. The first scan and the second scan are separate sampling events, meaning that the pin 704a of the actuator assembly 704 transitions from the second positional state to the first positional state after the first scan is performed, and the pin 704a subsequently transitions from the first positional state to back to second positional state prior to performing the second scan. During the period of time between the first scan and the second scan, the table 706 may be operated to move the card such that the region of the card aligned with the chamber aperture 808 moves from the first region 302 to the second region 304 (or any other region outside the first region 302).

Analysis data generated or otherwise derived by the sample analysis system 108 as a result of analyzing sample material obtained during the second scan (i.e., "second analysis data") is subtracted from analysis data generated or otherwise derived by the sample analysis system 108 as a result of analyzing sample material obtained during the first scan (i.e., "first analysis data") is processed (e.g., at the sample analysis system 108 or the controller 112) to derive the composition of the dried/absorbed material carried by the card (e.g., indicated at 306). Data representing such a composition is also referred to herein as "analysis data."

Sequencing Gas Flows During Ablation

After an object has been placed into operable proximity with the sample generation system 106, the interior 606a of the sample chamber 606 (e.g., sample chamber 800, etc.) contains atmospheric gases (e.g., including oxygen). Prior to sampling the object, a first purge is performed to remove the atmospheric gases (e.g., including oxygen) from the interior 606a. During the first purge, gas such as helium is introduced into the interior 606a (e.g., via the inlet 812). After the first purge, and during sampling the object, a carrier gas is introduced into the interior 606a (e.g., via the inlet 812), which can entrain ablated material in the plume generated when the laser beam irradiates the object. The carrier gas can include a gas such as helium, argon, or the like. After the object has been sampled, a second purge is performed to remove any vapors, particles, or the like or any combination thereof, which may have accumulated on the sidewalls defining the interior 606a of the sample chamber 606. During the second purge, gas such as nitrogen or argon is introduced into the interior 606a (e.g., via the inlet 812).

During the first purge, the selector of the multichannel valve to which the inlet conduit 816 is coupled can be actuated such that the inlet 812 is in fluid communication with a pressurized source of purge gas (e.g., helium, via the inlet conduit 816, the multichannel valve, and any conduits, tubes, etc., coupling the multichannel valve to a first pressurized source of gas such as helium), and the selector of the multichannel valve to which the outlet conduit 818 is coupled can be actuated such that the outlet 814 is in fluid communication with an input of the exhaust system (e.g., via the outlet conduit 818, the multichannel valve, and any conduits, tubes, etc., coupling the multichannel valve to the exhaust system).

During sampling of the object, the selector of the multichannel valve to which the inlet conduit 816 is coupled can be actuated such that the inlet 812 is in fluid communication with a pressurized source of purge gas (e.g., helium, via the inlet conduit 816, the multichannel valve, and any conduits, tubes, etc., coupling the multichannel valve to a pressurized source of gas such as helium, argon, etc.), and the selector of the multichannel valve to which the outlet conduit 818 is coupled can be actuated such that the outlet 814 is in fluid communication with an input of the sample analysis system 108 (or to an input of a sample preparation system that is not incorporated into the sample analysis system 108) (e.g., via the outlet conduit 818, the multichannel valve, and any conduits, tubes, etc., coupling the multichannel valve to the input of the sample analysis system or sample preparation system).

During the second purge, the selector of the multichannel valve to which the inlet conduit 816 is coupled can be actuated such that the inlet 812 is in fluid communication with a pressurized source of purge gas (e.g., helium, via the inlet conduit 816, the multichannel valve, and any conduits, tubes, etc., coupling the multichannel valve to a second pressurized source of gas such as nitrogen, argon, etc.), and the selector of the multichannel valve to which the outlet conduit 818 is coupled can be actuated such that the outlet 814 is in fluid communication with an input of the exhaust system (e.g., via the outlet conduit 818, the multichannel valve, and any conduits, tubes, etc., coupling the multichannel valve to the exhaust system).

ADDITIONAL REMARKS

Having described and illustrated numerous embodiments above, it will be recognized that the technology is not so limited.

Figure 16A:
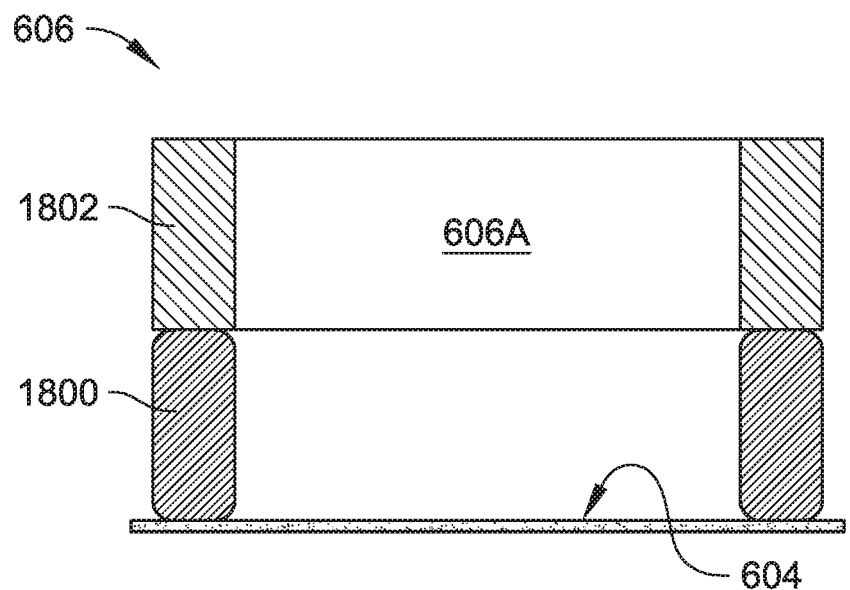
FIGS. 16A and 16B are cross-sectional schematic views illustrating a portion of a sample chamber having a compliant sealing member, according to one embodiment, and an operation thereof.
Figure 16B:
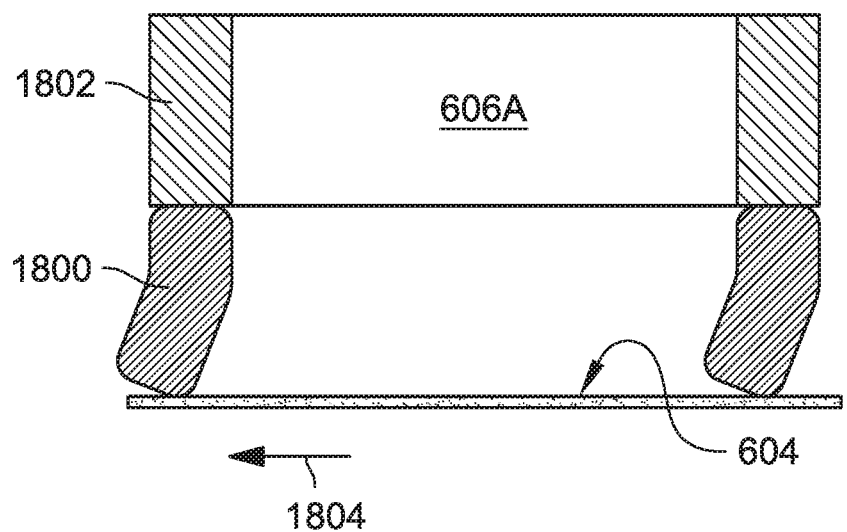

For example, the aforementioned gasket of the sample chamber has been discussed above as being provided as o-ring (e.g., as discussed with respect to gasket 806), or as another type of sealing member. In one embodiment, such other type of sealing member may be a compliant sealing member. For example, and as shown in FIGS. 16A and 16B, the sample chamber 606 may include a compliant sealing member 1800 (e.g., coupled to sample chamber body 1802 of the sample chamber 606). The compliant sealing member 1800 may be structured as a somewhat tubular structure formed of a material such as rubber, and may be capable of deforming when, for example, the surface of the object to be sampled (e.g., as indicated at 604) moves relative to the sample chamber 606. For example, if the surface 604 to the left (as illustrated by arrow 1804 in FIG. 16B), an end of the compliant sealing member 1800 contacting the surface 604 is pushed/pulled along in the same direction.

In another example, while some embodiments discussed above indicate that an object in operable proximity with the sample generation system 106 will move in unison with the sample chamber of the sample generation system 106, this is not strictly necessary. Thus, an object to be sampled may be moved relative to the sample chamber (e.g., before, during or after sampling of the object), the sample chamber may be moved relative to the object to be sampled (e.g., before, during or after sampling of the object), or a combination thereof. To facilitate such relative movement, the sample chamber may be kept stationary (e.g., disconnected from the frame 702, but coupled to another component of the sample generation system 106, such as the aforementioned housing), and the object handling system 102 may be configured to move the object relative to the stationary sample chamber.

In another example, while some embodiments discussed above indicate that the inlet conduit 816 and the outlet conduit 818 do not extend into the inlet 812 and the outlet 814, it will be appreciated that any of the inlet conduit 816 or the outlet conduit 818 may extend into the inlet 812 or the outlet 814, respectively, either partially or fully. Further, any of the inlet conduit 816 or the outlet conduit 818 may extend into the interior 606a of the sample chamber 606 (e.g., sample chamber 800).

CONCLUSION

The foregoing is illustrative of embodiments and examples of the invention and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A sample chamber, comprising:
   a sample chamber body defining an interior space;
   a transmission window coupled to the sample chamber body at a first end of the interior space;
   a sealing member coupled to the sample chamber body at a second end of the interior space opposing the first end, the interior space tapering inwardly adjacent the second end in a direction from the first end to the second end;
   an inlet conduit extending through the sample chamber body; and
   an outlet conduit extending through the sample chamber body,
   wherein the sample chamber and the sealing member are configured to abut a sample that is positioned by an actuator assembly.

2. The sample chamber of claim 1, wherein the transmission window comprises at least one of glass or sapphire.

3. The sample chamber of claim 1, wherein the sealing member includes at least one of a gasket or an o-ring.

4. The sample chamber of claim 1, wherein the sealing member includes a compliant sealing member.

5. The sample chamber of claim 1, further comprising a second sealing member disposed between the sample chamber body and the transmission window.

6. The sample chamber of claim 1, wherein the sample includes at least one of a pressed pellet or a fused bead.

7. The sample chamber of claim 1, wherein the sample is disposed on a card.

8. The sample chamber of claim 1, wherein the inlet conduit is coupled to at least one source of gas, the gas including at least one of helium, nitrogen, or argon.

9. A sample generation system, comprising:
   a sample chamber including
      a sample chamber body defining an interior space,
      a transmission window coupled to the sample chamber body at a first end of the interior space,
      a sealing member coupled to the sample chamber body at a second end of the interior space opposing the first end, the interior space tapering inwardly adjacent the second end in a direction from the first end to the second end;
      an inlet extending through the sample chamber body, and
      an outlet extending through the sample chamber body;
   a placement system configured to place a sample adjacent to the sample chamber, the placement system including
      a frame, and
      an actuator assembly coupled to the frame, where the actuator assembly is configured to place the sample adjacent to the sample chamber and abutted against the sealing member for laser ablation; and
   a laser configured to produce a laser beam that is propagated along a beam path to irradiate the sample.

10. The sample generation system of claim 9, wherein the sealing member includes at least one of a gasket or an o-ring.

11. The sample generation system of claim 9, wherein the sealing member includes a compliant sealing member.

12. The sample generation system of claim 9, wherein the actuator assembly includes a piston actuator.

13. The sample generation system of claim 12, wherein the piston actuator includes at least one of an electric actuator, a hydraulic actuator, a pneumatic actuator, a magnetic actuator, a mechanical actuator, or a threaded actuator.

14. A system for facilitating automated sample handling, comprising:
   an object handling system; and
   a sample generation system coupled to the inspection system, the sample generation system including
      a sample chamber including
         a sample chamber body defining an interior space;
         a transmission window coupled to the sample chamber body at a first end of the interior space;
         a sealing member coupled to the sample chamber body at a second end of the interior space opposing the first end, the interior space tapering inwardly adjacent the second end in a direction from the first end to the second end;

an inlet extending through the sample chamber body; and an outlet extending through the sample chamber body; and a placement system configured to place a sample adjacent to the sample chamber, the placement system including a frame, and an actuator assembly coupled to the frame, where the actuator assembly is configured to place the sample adjacent to the sample chamber and abutted against the sealing member for laser ablation.

15. The system for facilitating automated sample handling of claim 14, wherein the object handling system includes a robotic manipulator.

16. The system for facilitating automated sample handling of claim 14, wherein the sealing member includes at least one of a gasket or an o-ring.

17. The system for facilitating automated sample handling of claim 14, wherein the sealing member includes a compliant sealing member.

18. The system for facilitating automated sample handling of claim 14, wherein the actuator assembly includes at least one of an electric actuator, a hydraulic actuator, a pneumatic actuator, a magnetic actuator, a mechanical actuator, or a threaded actuator.

19. The system for facilitating automated sample handling of claim 14, further comprising:

an inspection system coupled to the handling system.

20. The system for facilitating automated sample handling of claim 14, further comprising at least one of:

a sample analysis system;

a transport conduit; or a controller.

* * * * *